United States Patent
Szilagyi et al.

(10) Patent No.: US 10,582,433 B2
(45) Date of Patent: Mar. 3, 2020

(54) DYNAMIC EXPERIENCE MANAGEMENT IN COMMUNICATIONS

(71) Applicant: NOKIA SOLUTIONS AND NETWORKS OY, Espoo (FI)

(72) Inventors: Peter Szilagyi, Budapest (HU); Csaba Vulkan, Budapest (HU)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/090,260

(22) PCT Filed: Apr. 1, 2016

(86) PCT No.: PCT/EP2016/057180
§ 371 (c)(1),
(2) Date: Sep. 30, 2018

(87) PCT Pub. No.: WO2017/167392
PCT Pub. Date: Oct. 5, 2017

(65) Prior Publication Data
US 2019/0116535 A1  Apr. 18, 2019

(51) Int. Cl.
*H04W 28/04* (2009.01)
*H04W 28/24* (2009.01)
(Continued)

(52) U.S. Cl.
CPC ....... *H04W 36/165* (2013.01); *H04L 43/0829* (2013.01); *H04L 43/0858* (2013.01);
(Continued)

(58) Field of Classification Search
CPC ... H04W 36/165; H04W 28/04; H04W 76/12; H04W 72/087; H04W 28/24;
(Continued)

(56) References Cited

U.S. PATENT DOCUMENTS

| | | | |
|---|---|---|---|
| 10,122,691 B2 * | 11/2018 | Lin | G06F 11/1004 |
| 2005/0097209 A1 * | 5/2005 | McDonagh | H04L 41/046 709/224 |

(Continued)

FOREIGN PATENT DOCUMENTS

| | | |
|---|---|---|
| EP | 1304831 A2 | 4/2003 |
| WO | 03/096729 A1 | 11/2003 |
| WO | 2016/023935 A1 | 2/2016 |

OTHER PUBLICATIONS

International Search Report and Written Opinion for International Application No. PCT/EP2016/057180, dated Sep. 16, 2018 (10 pages).

(Continued)

*Primary Examiner* — Mohamed A Kamara
(74) *Attorney, Agent, or Firm* — Brake Hughes Bellermann LLP

(57) ABSTRACT

A method comprises detecting (402) QUIC packets transmitted (401, 406) between network elements (UE, content server) of a communication system. Based on a detected QUIC packet, the method comprises obtaining (403), at a first measurement point and at a second measurement point, user plane customer experience measurement information and optionally context information. The method comprises providing (404), to the first measurement point, user plane customer experience measurement information and optionally context information, obtained at the second measurement point. The method comprises correlating (405) user plane customer experience measurement information obtained at the first measurement point, with user plane customer experience measurement information received from the second measurement point, by using context information obtained at the first measurement point and context information received at the first measurement point.

16 Claims, 17 Drawing Sheets

(51) Int. Cl.
    *H04W 36/16*     (2009.01)
    *H04L 12/26*     (2006.01)
    *H04W 24/10*     (2009.01)
    *H04W 76/12*     (2018.01)
    *H04L 12/801*     (2013.01)
    *H04W 36/00*     (2009.01)
    *H04W 36/26*     (2009.01)
    *H04W 72/08*     (2009.01)

(52) U.S. Cl.
    CPC .......... *H04L 43/0864* (2013.01); *H04L 43/12* (2013.01); *H04L 47/34* (2013.01); *H04W 24/10* (2013.01); *H04W 28/04* (2013.01); *H04W 28/24* (2013.01); *H04W 36/0022* (2013.01); *H04W 36/0033* (2013.01); *H04W 36/26* (2013.01); *H04W 72/087* (2013.01); *H04W 76/12* (2018.02)

(58) Field of Classification Search
    CPC ......... H04W 36/0022; H04W 36/0033; H04W 36/26; H04W 24/10; H04L 43/0829; H04L 43/0858; H04L 43/0864; H04L 47/34; H04L 43/12
    See application file for complete search history.

(56) References Cited

U.S. PATENT DOCUMENTS

2016/0156520 A1*   6/2016   Scully .................. H04W 24/02
                                                        370/254
2017/0373950 A1*   12/2017  Szilagyi ............. H04L 41/5035

OTHER PUBLICATIONS

Office Action for Japanese Application No. 2018-551776, dated Oct. 7, 2019, 3 pages.
Jain et al.; Mobile Throughput Guidance Inband Signaling Protocol; draft-flinck-mobile-throughput-guidance-03.txt; Internet Engineering Task Force, Sep. 7, 2015; 20 pages.
Office Action for Korean Patent Application No. 10-2018-7031849, dated Sep. 18, 2019, 8 pages.

* cited by examiner

| | | |
|---|---|---|
| QUIC | Encrypted header fields and application data | |
| | Sequence Number | No header fields suitable for enrichment (additionally, any change to the QUIC headers causes the connection to break) |
| | Version | |
| | Connection ID (CID) | |
| | Public Flags | |
| UDP | Checksum | No header fields suitable for enrichment |
| | Length | |
| | Destination Port | |
| | Source Port | |
| IPv4 | Options (0 to 40 bytes) | |
| | Destination Address | |
| | Source Address | |
| | ... | |

Fig. 3

DYNAMIC EXPERIENCE MANAGEMENT IN COMMUNICATIONS

CROSS-REFERENCE TO RELATED APPLICATIONS

This application is a national stage entry of PCT Application No. PCT/EP2016/057180 filed Apr. 1, 2016, entitled "DYNAMIC EXPERIENCE MANAGEMENT IN COMMUNICATIONS" which is hereby incorporated by reference in its entirety.

TECHNICAL FIELD

The invention relates to communications.

BACKGROUND

Dynamic experience management (DEM) is a real-time quality of experience (QoE) management framework for CSP/ISP systems providing internet access by utilizing communications technologies such as WCDMA, LTE, LTE-A, Wi-Fi, fixed, or any other suitable communications technologies.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which

FIG. 3 illustrates a full protocol stack used by QUIC connections;

DETAILED DESCRIPTION OF SOME EMBODIMENTS

Figure 1:
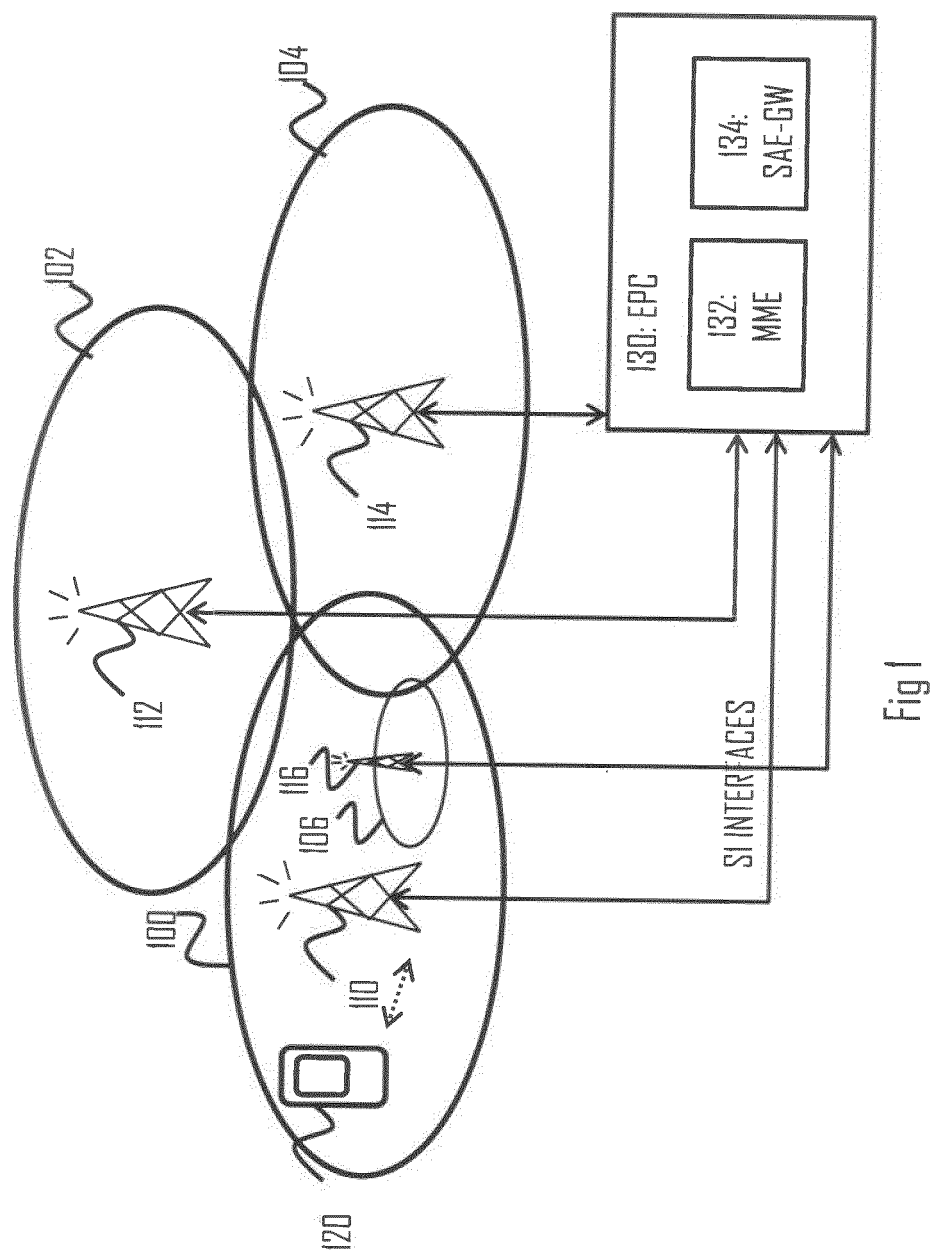
FIG. 1 illustrates a wireless communication system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Further-more, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: universal mobile telecommunication system (UMTS, 3G) based on basic wideband-code division multiple access (W-CDMA), high-speed packet access (HSPA), long term evolution (LTE), LTE-advanced (LTE-A), and/or 5G system. The present embodiments are not, however, limited to these systems.

The embodiments are not restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input-multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be nonexistent. Some other technology advancements probably to be used are software-defined networking (SDN), big data, and all-IP, which may change the way networks are being constructed and managed.

FIG. 1 illustrates an example of a cellular communication system to which embodiments of the invention may be applied. Cellular radio communication networks, such as the long term evolution (LTE), the LTE-advanced (LTE-A) of the 3rd generation partnership project (3GPP), or the predicted future 5G solutions, are typically composed of at least one network element, such as a network element 110, providing a cell 100. Each cell may be, e.g. a macro cell, a micro cell, femto, or a pico cell, for example. The network element 110 may be an evolved node-B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support dual connectivity (DC) in which the terminal device 120 has established multiple connections with cells associated with a master eNB network element and a secondary eNB network element.

The network element 110 may employ carrier aggregation in which the terminal device 112 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, the eNBs may be connected to each other with an X2 interface as specified in LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134.

The radio system of FIG. 1 may support machine type communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. The at least one terminal device 120 may also comprise another MTC capable device, such as a sensor device providing position, acceleration and/or temperature information to name a few examples.

Figure 2:
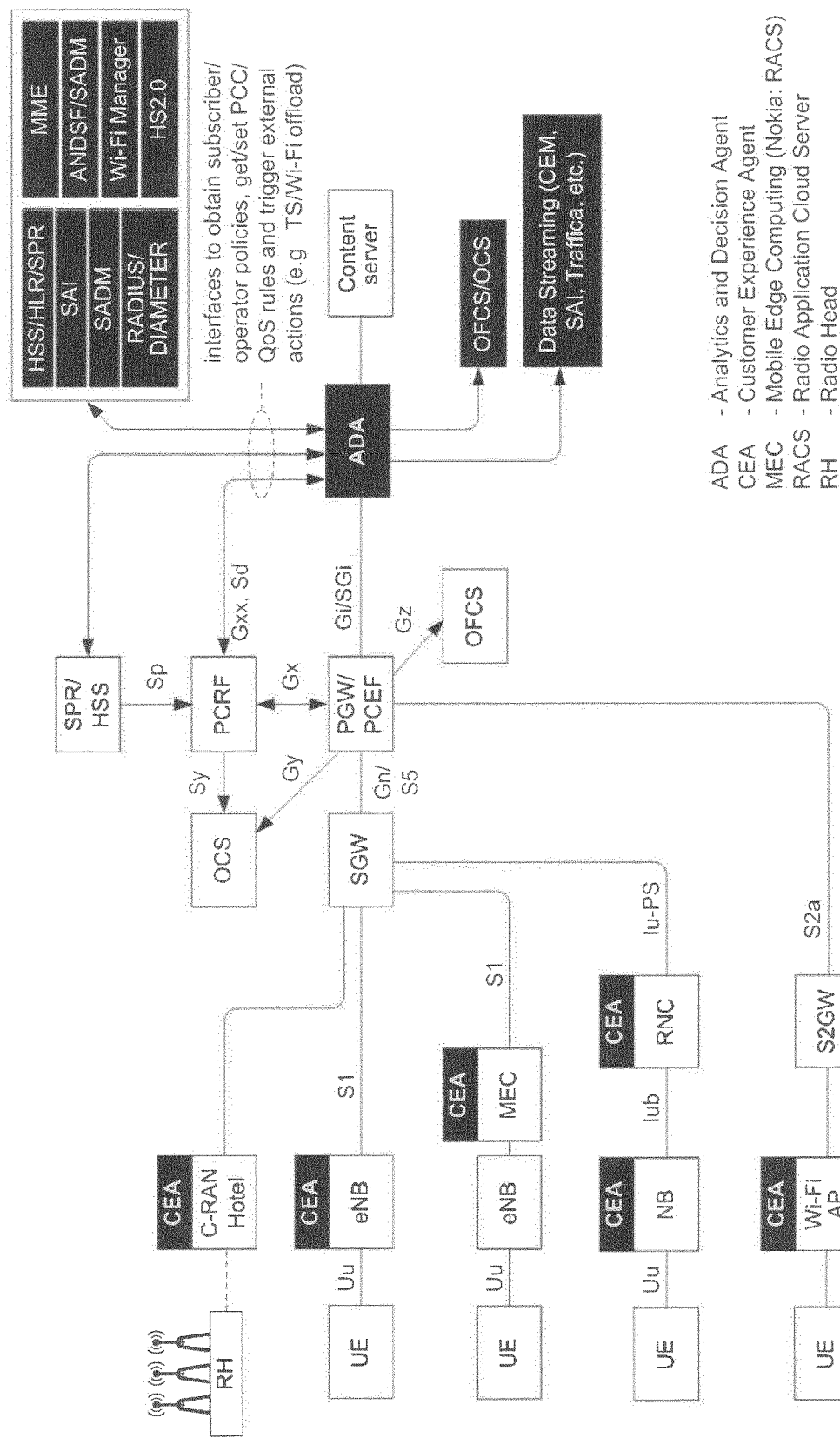
FIG. 2 illustrates a DEM architecture.

The dynamic experience management (DEM) enables providing good customer experience for popular OTT applications (e.g. YouTube, Facebook, Waze, Viber, etc.). However, management of other service verticals (e.g. native VoLTE or other IMS services) is also possible. A DEM architecture may comprise a central core network node, e.g. an analytics and decision agent (ADA), and at least one distributed radio network node, e.g. a customer experience agent (CEA). FIG. 2 illustrates the DEM architecture including several CEA deployment options. ADA may be deployed on a Gi/SGi interface for collecting measurements and performing correlated analytics and actions on a coherent set of flows (e.g. multiple cells or eNBs), enabling ADA to efficiently redistribute radio and transport network resources according to demand in a flexible way. ADA may also interface with other core network nodes such as HSS, SAI, etc.

DEM operates on accurate indicators of customer experience CE and network status collected in a correlated way. This guarantees that a measured QoE is interpreted contextually, that is, correlated with the network performance, user location, device capabilities, etc. and that appropriate actions may be calculated and enforced. This information may be extracted through real-time U-plane measurements from the user plane (application) traffic itself.

CEA and ADA use in-band header enrichment (HE) technology (i.e. information elements are written directly into protocol headers of the user plane packets) for communicating with each other and for executing per-flow measurements that require two measurement points. This measurement technique may be referred to as collaborative measurement and it includes the measurements that require ADA and CEA to exchange information corresponding to a specific U-plane packet or flow, such as measuring one-way delay between ADA and CEA (that involves enriching timestamps to packets at ADA and investigating the very same packets with the enriched timestamp at CEA). The in-band U-plane HE is an efficient mechanism to exchange U-plane flow related information between CEA and ADA, as HE natively binds the measurement information to the related data stream. Specifically, CEA and ADA use TCP option HE for in-band measurements, as most OTT applications use TCP as the transport layer protocol (thus the TCP header is present in most OTT packets), and TCP option space is a fully supported end-to-end data container (i.e. it is not processed, modified or removed by intermediate nodes, routers or firewalls).

YouTube and other Google services are moving away from TCP, in favour of transmitting the data over QUIC which is an emerging UDP-based fully encrypted user space transport protocol by Google. While QUIC mimics the operation of a TCP connection regarding general congestion and flow control behaviour (e.g. slow start, reacting to packet loss, etc.), the wire format of QUIC is fundamentally different from that of TCP, having a significant impact on the basic enablers of in-band U-plane HE. Firstly, a QUIC layer is fully authenticated and partly encrypted, which prevents any intermediate node from being able to modify an in-flight packet without invalidating it and causing the end-to-end connection to break. Secondly, a QUIC packet contains no data field such as the TCP options that may be used to encode additional information by the intermediate nodes. Thirdly, the transport protocol under QUIC is UDP which has no protocol fields that may be header enriched.

The adoption of QUIC makes HE techniques difficult within and above the transport layer, preventing DEM from efficiently collecting the necessary measurements for the QoE management of QUIC traffic. YouTube (the first application to migrate over QUIC) is a popular and data intensive application, and potentially more applications are eventually adopting QUIC. Thus DEM is to enable the measurement collection in order to efficiently handle QUIC.

In order to enable the efficient collection of the U-plane measurements when content is delivered over QUIC, HE is not an option due to UDP and QUIC protocol design. FIG. 3 illustrates a full protocol stack used by QUIC connections, showing relevant data fields used by QUIC connections.

HE within DEM is to exchange information between CEA and ADA (not to publish information from the network to external servers). Therefore, CEA and ADA restore the content of each header enriched downlink and uplink packet to their original state (i.e. before their enrichment) by stripping off any enriched information. In theory, this capability allows that enriched packets violate the end-to-end protocol wire formats and conditions (e.g. checksum validity, header length field consistency, etc.) and carry information in a way that causes the end-to-end U-plane connection to break provided that the packet leaks out from the network in its enriched form (which is never supposed to happen). In practice, however, a robust HE implementation does not allow such freedom of operation, and retains full end-to-end packet validity, imposing an additional constraint. There are at least two reasons for keeping the packet fully valid at each hop in the network. The consequences of leaking invalid enriched packets are severe and are to be prevented even outside of normal DEM operation, such as due to CEA/ADA software reconfiguration, restart, overload or malfunction. As the probability of packet leakage is not guaranteed to be zero in these cases, packet validity is to be ensured. Advanced devices or intermediate nodes (such as firewalls, routers, security gateways, etc.) within the network may perform validity checks on packet headers and fields above the IP layer between CEA and ADA and may detect and discard invalid packets.

Taking into account the requirement of keeping packets fully valid, there are reasons that prevent the use of the in-band HE within the QUIC and UDP layers. These reasons include QUIC header authentication and encryption, for example. QUIC is to hide as much protocol information as possible from the intermediate network nodes. Accordingly, most of the header fields are encrypted in the end-to-end path, making their interpretation and modification impossible by the intermediate node. There are a few protocol fields (public flags, version, connection ID, and sequence number) that are transmitted in cleartext, but they are also authenticated in the end-to-end path, meaning that any change to their values or insertion of additional bytes make the packet invalid (which is to be avoided). Further, UDP header fields (checksum, length, source, and destination ports) are not able to carry any additional information other than the bare minimum required for the protocol to fulfil its goal, i.e. to identify port numbers of a connection. Existing header fields are not usable for the in-band HE in QUIC for following reasons. Checksums are either to be set to zero (in case they are not calculated) or set to the one and only correct value (i.e. 1's complement of the payload and selected headers), thus changing the checksum to encode specific information is not possible without invalidating it. Likewise, changing the port numbers creates out of context invalid packets, thus it is not an option for HE. Injecting data between the UDP header and the QUIC payload (i.e. essentially inflating the UDP payload) also invalidates the packet structure from a standard UDP/QUIC processing point.

Using IPv4 options (which are similar to the TCP options) for the in-band HE have an impact on the deployment alternatives of CEA and ADA, as the default and recommended behaviour of most routers and firewalls is to discard packets having any kind of IP options (for strictly-interpreted security and performance reasons). Nevertheless, by carefully choosing the location of ADA, the IPv4 options may be used.

If the user plane connections use IPv6 instead of IPv4, IPv6 extension headers provide a similar way to the IPv4 options as for carrying the enriched information without the risk of being discarded by the routers and firewalls. However, the adoption of IPv6 in the end-to-end path is still low.

The in-band HE for the user plane measurement collection may enable collaborative in-band measurements in an in-band HE apparatus suitable for common U-plane protocols (including TCP and RTP).

Figure 4:
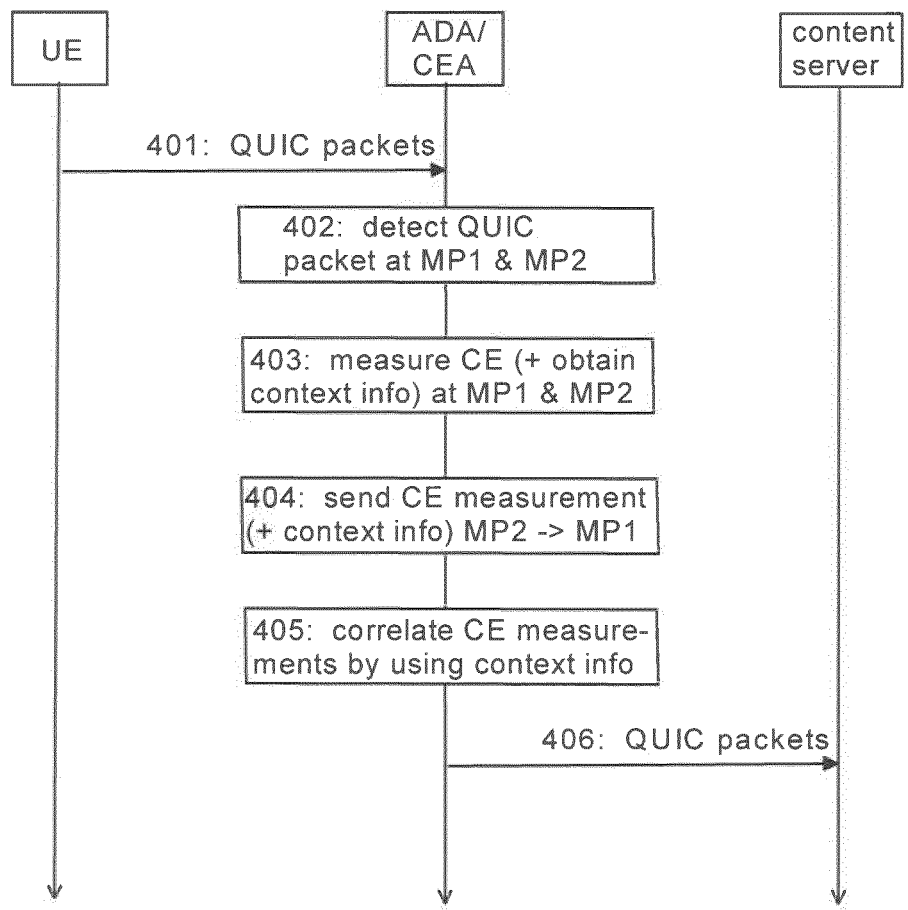
FIG. 4 illustrates a signalling diagram of a procedure for dynamic experience management according to an embodiment of the invention.

Let us now describe an embodiment of the invention for dynamic experience management when using QUIC, with reference to FIG. 4. However, instead of QUIC, an exemplary procedure is also applicable to VPN technology or L2/L3 tunneling. FIG. 4 is a signalling diagram illustrating a method for performing, in network apparatus, collaborative CE measurements on user plane packets transmitted between network elements of the cellular communication system. The network apparatus may comprise a network node, an access node, a base station, a terminal device, a server computer or a host computer. For example, the server computer or the host computer may generate a virtual network through which the host computer communicates with the terminal device. In general, virtual networking may involve a process of combining hardware and software network resources and network functionality into a single, software-based administrative entity, a virtual network. In some embodiments, the network node may be a terminal device. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. Virtual networking may also be used for testing the terminal device.

Referring to FIG. 4, a method comprises detecting (block 402) user plane packets transmitted (block 401, 406) between network elements (e.g. UE, content server) of the communication system. Based on a detected user plane packet, the method comprises obtaining (block 403), at a first measurement point and at a second measurement point, user plane customer experience measurement information (e.g. the network node performs customer experience measurements on the QUIC connection, at the first measurement point and at the second measurement point) and optionally context information (see FIGS. 12, 13, 14). The method comprises transmitting (block 404), from the second measurement point to the first measurement point, user plane customer experience measurement information and optionally context information (see FIGS. 13, 14), obtained at the second measurement point. The method comprises correlating (block 405), user plane customer experience measurement information obtained at the first measurement point, with user plane customer experience measurement information received from the second measurement point regarding the same user plane packet or a related user plane packet, by using context information obtained at the first measurement point and context information received at the first measurement point (or context information of a user plane packet used to transfer the user plane customer experience measurement information from the second measurement point to the first measurement point, see FIG. 12).

In an embodiment, the first measurement point and the second measurement point use in-band IP options for header enrichment to collaborate with each other. Herein, the IP header enrichment may use IPv4 options or IPv6 options.

In another embodiment, the first measurement point and the second measurement point use in-band control plane header enrichment for collaborating with each other.

In yet another embodiment, the first measurement point and the second measurement point use a dedicated off-band connection (established between the measurement points) for collaborating with each other.

For example, the apparatus may comprise an analytics and decision agent (ADA) utilized as the first measurement point, and a customer experience agent (CEA) utilized as the second measurement point, or vice versa. The apparatus may comprise a virtual node and/or a distributed node, or it may be integrated in another network node or network element.

FIG. 4 illustrates an uplink implementation. However, an exemplary procedure is also applicable to a downlink implementation, as well.

The context information may include user plane packet context information, context information on the second measurement point, and/or other context information (such as protocol-related context information). The user plane packet context information may include context information on the user plane packet which user plane packet is used to transfer the user plane customer experience measurement information from the second measurement point to the first measurement point. The user plane packet context information may include context information on the measured user plane packet. The user plane packet context information may identify the packet measured and/or the packet used to transfer the measurement information. The user plane packet context information may indicate the time when the measurement was performed and/or when the packet used to transfer the measurement was sent (e.g. a timestamp).

An embodiment relates to a specific ADA deployment for supporting the IPv4 (or IPv6) options in order to perform the U-plane measurements within DEM when content is delivered over QUIC. Another embodiment relates to in-band C-plane communication in order to perform the U-plane measurements within DEM when the content is delivered over QUIC. A yet another embodiment relates to a dedicated off-band connection in order to perform the U-plane measurements within DEM when the content is delivered over QUIC. These embodiments are selectively applied by CEA and ADA to connections that do not enable the in-band HE natively (whereas for regular TCP or RTP/UDP connections, the in-band mechanisms may be used).

Figure 5:
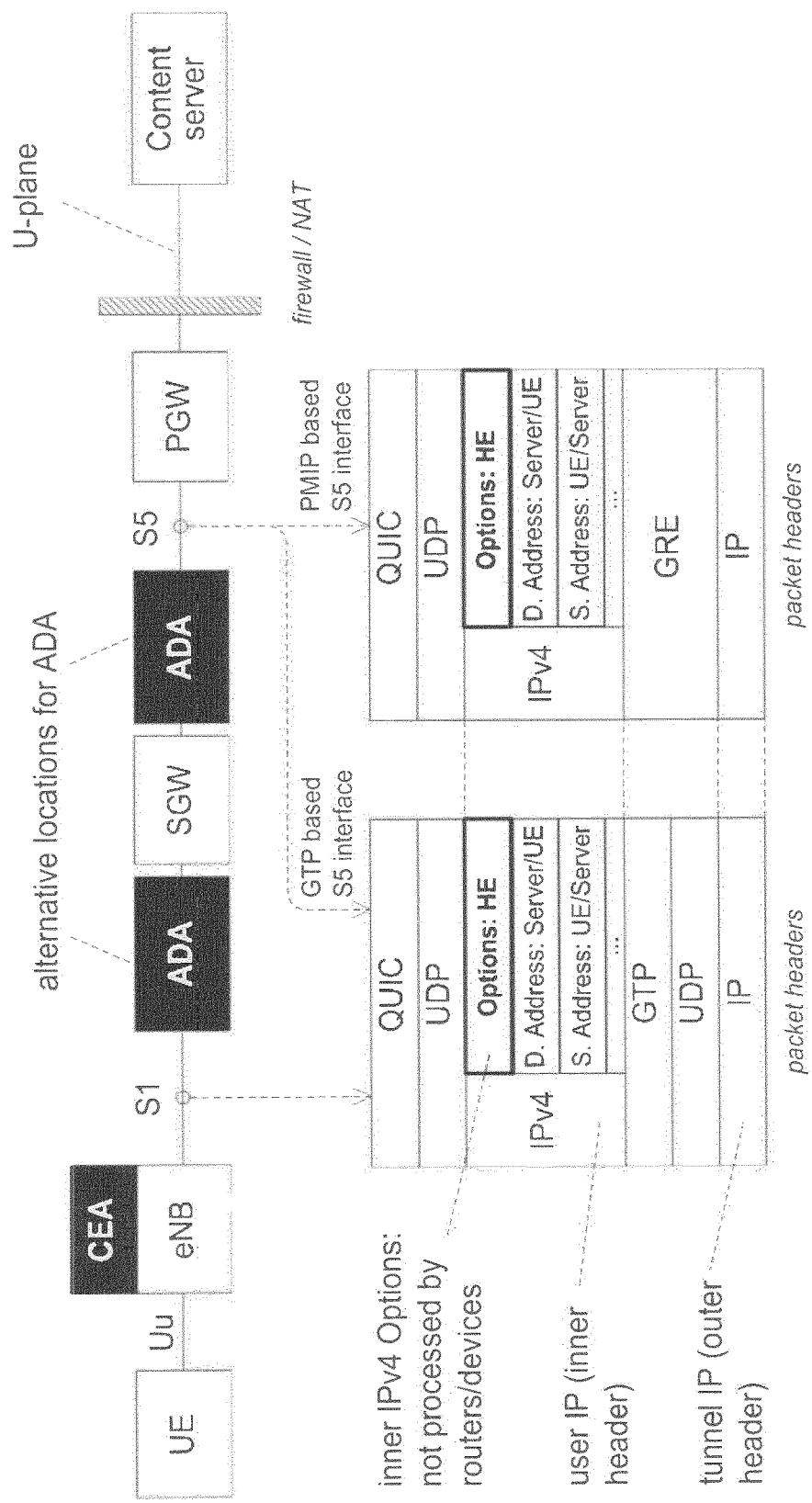
FIG. 5 illustrates the use of IPv4 options for in-band HE on an S1/S5 interface according to an embodiment.

In an embodiment, the specific ADA deployment for supporting the IPv4 options enables the use of the user IPv4 options for HE between CEA and ADA, without the risk of having the header-enriched packets discarded. ADA may be deployed as close to SGW/PGW as possible (i.e. have as few intermediate physical/virtual nodes/devices/appliances as possible between ADA and SGW/PGW). If needed, it may be ensured that the configuration of the intermediate devices enables packets with the IP options to pass through without being modified or discarded. A user plane IP header is encapsulated in a GTP/UDP/IP tunnel between eNB and SGW, and within either a GTP or PMIP (GRE/IP) tunnel between SGW and PGW. Thus, on an eNB-PGW path, the IP options are natively concealed from router/firewall mechanisms (that may discard packets with IP HE). Therefore, ADA may be deployed either on an S1 interface of SGW, or on an S5 interface between SGW and PGW. FIG. 5 illustrates the use of the IPv4 options for the in-band HE with ADA on the S1/S5 interface.

Figure 6:
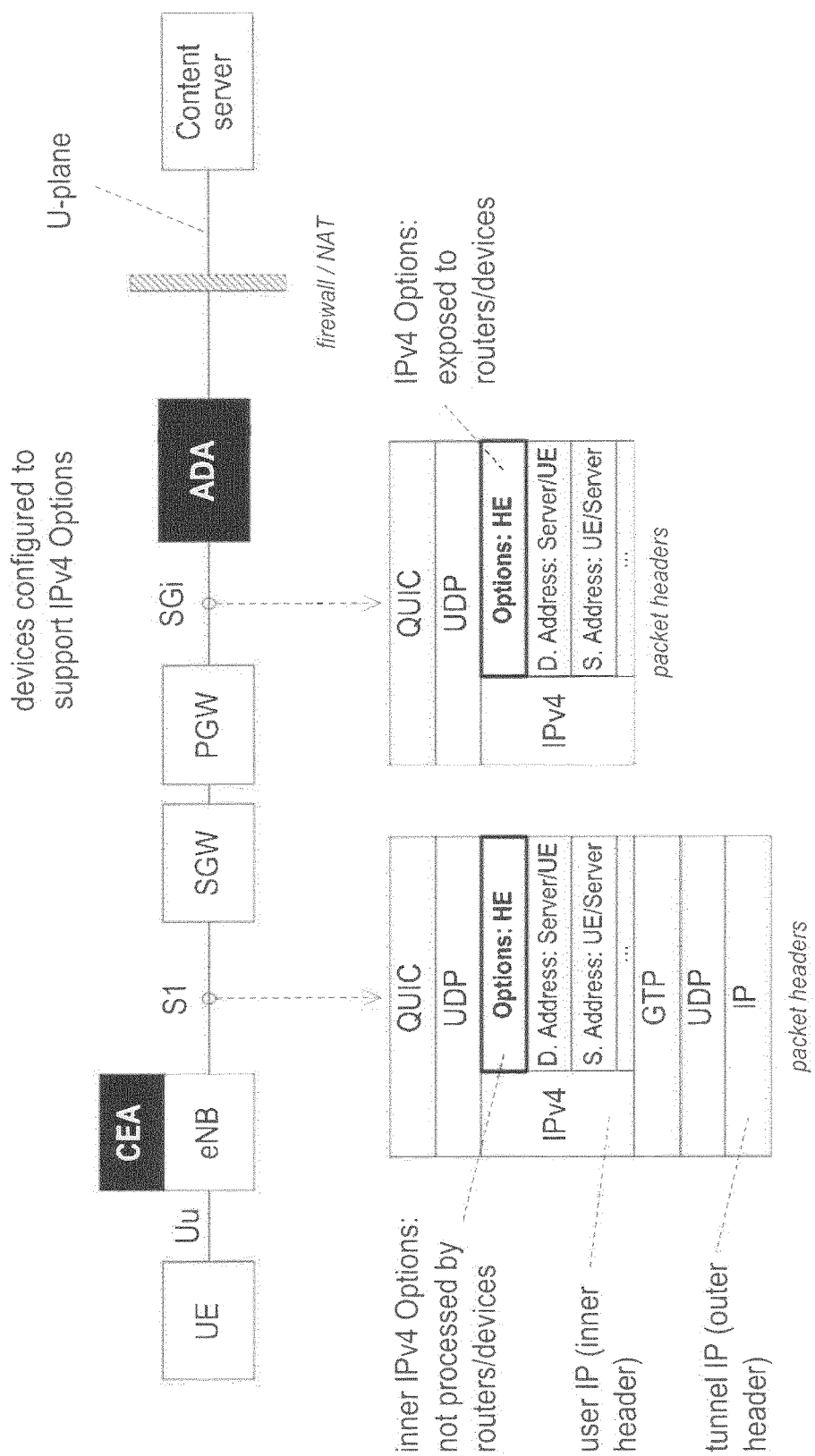
FIG. 6 illustrates the use of the IPv4 options for the in-band HE on an SGi interface according to an embodiment.

Alternatively, the ADA may also be deployed on an SGi interface. In that case, the user plane IP headers in the path between PGW and ADA become the only IP header, and thus the user plane IP headers are visible to the routers and other transport devices. Therefore, an IP option friendly configuration between PGW and ADA is to be ensured. FIG. 6 illustrates the use of the IPv4 options for the in-band HE with ADA on the SGi interface.

The use of the in-band IP option HE also allows performing the collaborative measurements on the U-plane packets.

Figure 7:
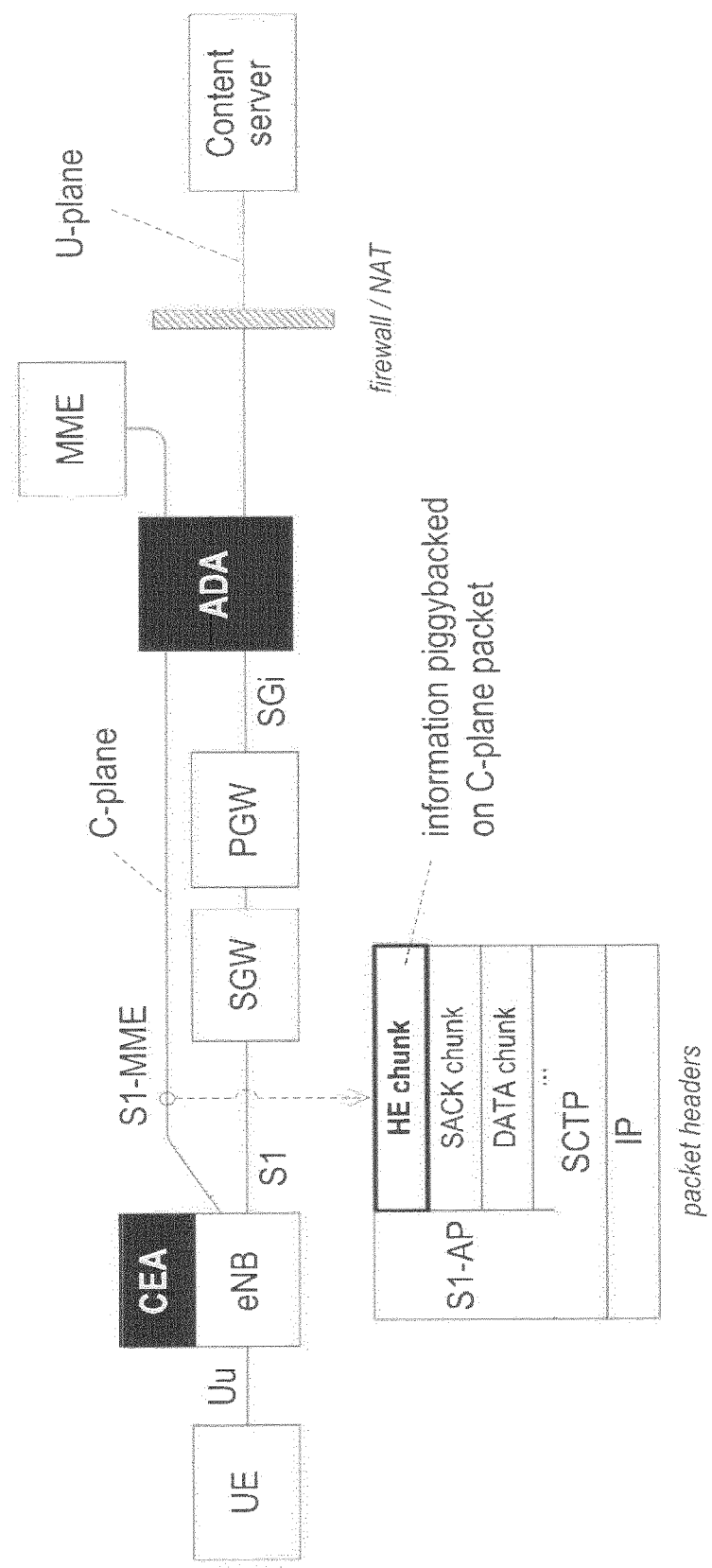
FIG. 7 illustrates the use of C-plane packets to piggy-back information according to an embodiment.

In an embodiment, the in-band C-plane communication allows ADA and CEA to use C-plane header enrichment (by means of injecting special SCTP chunks to the packets) for the communication in case ADA is deployed in such a way that it is able to intercept both the U-plane and the C-plane connections. Besides handling the user plane connections, eNB has dedicated network-internal connections to control plane network elements, such as MME. Such connections are established every time (provided that eNB is in operation); thus the management of the connections is provided by the system itself. CEA is able to access the C-plane, as CEA may be either an internal function of eNB or deployed next to eNB. Therefore, the C-plane connection effectively has a role of a pre-established off-band connection that may be used as a container for CEA-ADA measurement communication. As the C-plane connections are not associated with any particular U-plane connection, CEA and ADA explicitly refer to the identity of the U-plane connections (as well as the corresponding U-plane measurements) within their C-plane communication. FIG. 7 illustrates the use of the C-plane packets to piggy-back U-plane measurement and connection information.

Figure 8:
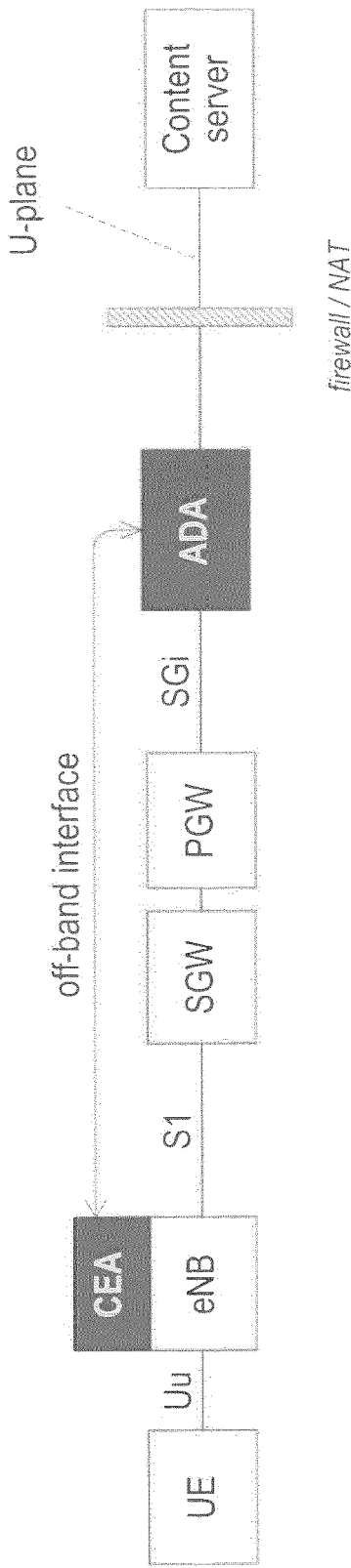
FIG. 8 illustrates off-band communication between CEA and ADA according to an embodiment.

In an embodiment, the dedicated off-band connection is established by CEA and ADA in order to exchange information on QUIC connections and to perform collaborative measurements on the QUIC connections. The off-band connection is not related to any existing U-plane connection (which is the case in the in-band C-plane communication too). Therefore, CEA and ADA include the identity of the U-plane connections on the off-band interface along with the corresponding QUIC measurement information/attributes. For the dedicated off-band communication, CEA and ADA represent the off-band connection endpoints (unlike in the in-band C-plane communication), and thus they may manage the establishment of the off-band connection themselves. FIG. 8 illustrates the off-band communication between CEA and ADA.

In an embodiment, when using either the C-plane or dedicated off-band connections, CEA and ADA use alternative mechanisms to execute the collaborative measurements on the U-plane connections (e.g. they measure one-way delay or packet loss between CEA and ADA, or collect RTT measurements over a radio access segment). This capability is normally provided by the in-band U-plane HE which is not available, having only off-band communication.

An embodiment enables the collaborative measurements over QUIC. Additionally, the C-plane or dedicated off-band connection may be used as the only way to communicate between CEA and ADA, especially as a way to perform the collaborative measurements without using the in-band U-plane HE.

In an embodiment, regarding the specific ADA deployment for supporting the IPv4 options, in case ADA is deployed on the S1/S5 interface, no further actions are needed as the GTP/PMIP tunneling on these interfaces makes the usage of the IPv4 options safe (see FIG. 5). In case ADA is deployed on the SGi interface, an IPv4 option friendly environment is to be created to ensure that the U-plane packets with the IPv4 options are forwarded between PGW and ADA (see FIG. 3).

In physical deployments (i.e. PGW and ADA are physical network elements with dedicated HW instances), the local PGW-ADA connections may be implemented e.g. with L2 switches that do not process the IP layer (packets) at all (and thus do not interfere with the packets having the IPv4 options). Alternatively, the PGW-ADA connectivity may be implemented at least partly by using L3 switches/routers. In that case, each L3 transport device participating in the U-plane packet forwarding between PGW and ADA is configured to support the usage of the IPv4 options.

In a telco cloud deployment (i.e. PGW and ADA are implemented as VNFs), PGW and ADA may be co-located in the same datacentre to ensure that the U-plane traffic forwarded between PGW and ADA does not leave the boundaries of the internal datacentre network. In an optimal case, PGW and ADA VNFs are not only run in the same datacentre but also on the same datacentre HW instance (server). Thus their connectivity is handled by a local programmable virtual network (e.g. implemented by Open-VSwitch). In that case, PGW-ADA traffic does not even appear on physical network interfaces, as the PGW-ADA traffic is forwarded entirely in a server/hypervisor memory. NFV service chain definitions may place PGW and ADA VNFs adjacent in the network service graphs, so that there is no intermediate VNF between PGW and ADA in a U-plane processing chain.

In an embodiment, regarding the in-band C-plane communication, in the ADA deployment (see FIG. 7), both the U-plane and C-plane connections of eNBs are intercepted (anyway, CEA has access to the C-plane due to its co-located or integrated deployment with eNB). The C-plane connections between eNB and MME (i.e. the S1-MME interface) use SCTP as the transport layer protocol. The SCTP payload is structured into different types of chunks (e.g. DATA, SACK, HEARTBEAT, etc.), which enables multiplexing various streams of information into the same packet. To piggy-back information on SCTP packets without interfering with the already present C-plane information, a dedicated SCTP chunk type may be used outside of standardized (RFC4960) types. CEA piggy-backs information towards ADA on the C-plane packets sent by eNB to MME, whereas ADA piggy-backs information towards CEA on the C-plane packets originated by MME to eNB. The size of the C-plane packets created by eNB and MME are usually well below MTU of the C-plane path. Thus enriching additional information to a SCTP packet does not cause IP fragmentation. As the information enriched on the C-plane packets only concerns CEA and ADA, they strip off the enriched data before sending the packets to their destination. Additionally, by setting the highest order 2 bits of the chunk type to '10', the eNB/MME SCTP endpoints are instructed to ignore unknown chunk types without considering it an error (i.e. ensuring that the SCTP packets do not cause any problems even if they are not stripped). On SCTP connections there may be a heartbeat mechanism that regularly transmits packets on the C-plane connection in both directions even if there is no regular ongoing C-plane traffic. Thus CEA and ADA find a carrier for the piggy-backed information soon at any given time.

In an embodiment, the dedicated off-band connection may be established by CEA and ADA for exchanging information on a user plane (U-plane). The dedicated off-band connection may be established in a client-server role split, with ADA behaving as a server and listening to incoming connection requests from CEA instances and each CEA behaving as a client, initiating a connection to ADA. The server side details of the connection (e.g. IP address, port number, protocol) may be communicated to the CEA instances by means of a static configuration ("well known" values), DHCP configuration, within VNF image descriptors through an NVF orchestrator and VNF manager, etc. The communication may be encrypted and authenticated with cryptography technology (e.g. by using TLS over TCP, and any protocol or data structure above TCP, such as HTTP, JSON, TLV, etc.).

A control plane (C-plane) connection and the dedicated off-band connection involve identical functions, except that the C-plane connection is already established when CEA and ADA operations start, i.e. the management of the C-plane connection is automatically carried out by the eNB/MME network elements. In the following, whenever there is a reference to the off-band connections, it concerns both the C-plane connections and the dedicated off-band connections.

The off-band connections are not related to specific U-plane connections (e.g. QUIC/UDP flows), whereas CEA and ADA send pieces of information (e.g. exchange measurements) that correspond to the specific U-plane connections. Therefore, CEA and ADA may include the identity of the corresponding U-plane connection with any additional measurement, attribute or piece of information when sending it over the off-band connection. For QUIC connections, the QUIC connection identity (CID, see FIG. 3) available in the QUIC packet headers may be used as a unique identifier of the U-plane connection. For VPN connections, a combination of L2/L3 protocol identities (addresses, protocol numbers, ports—if present, etc.) form an identity. The additional information may be referred to as connection information or context information.

Figure 9:
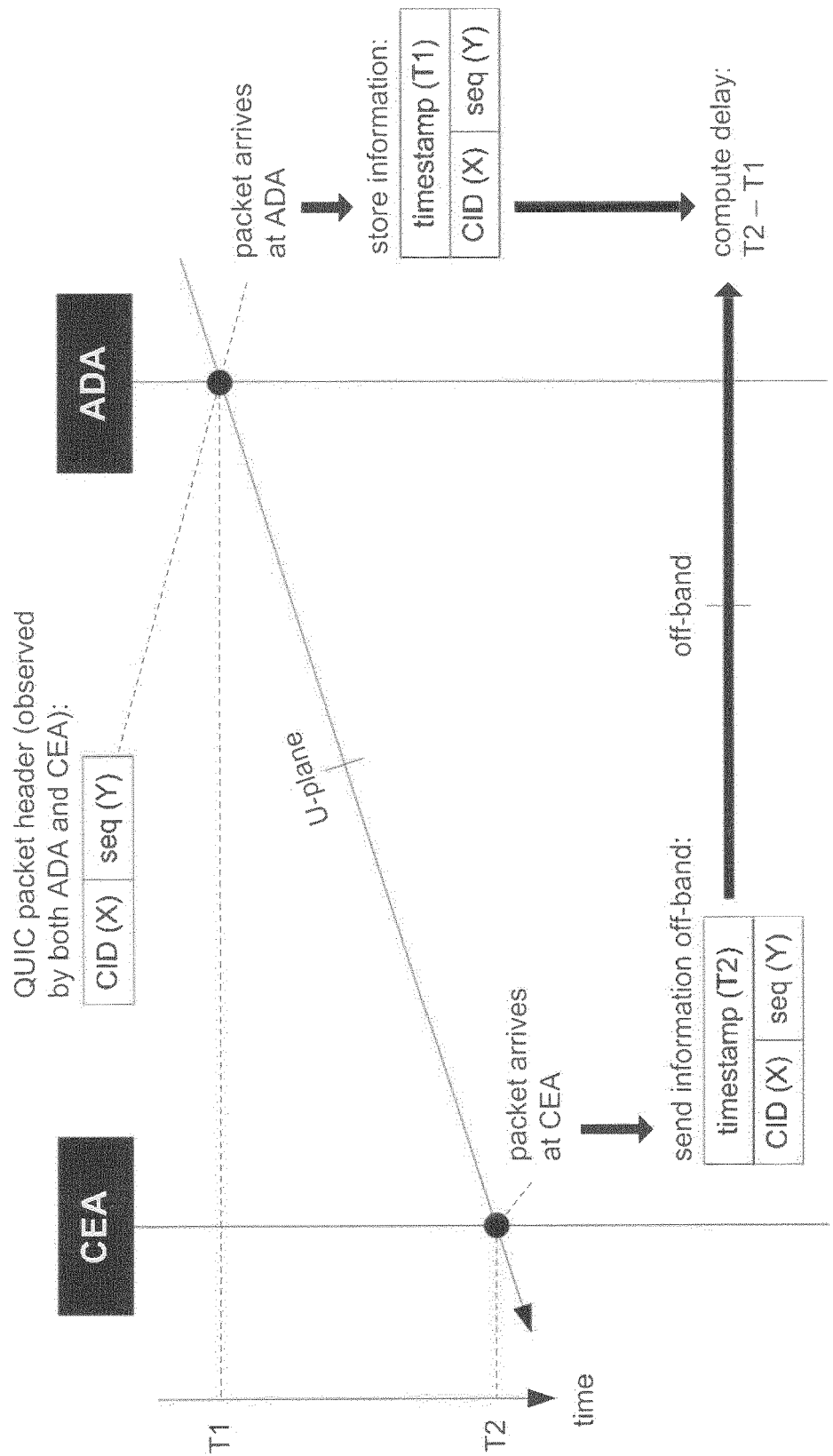
FIG. 9 illustrates collaborative one-way downlink delay measurement via an off-band connection according to an embodiment.

The off-band connections enable performing collaborative measurements between the measurement points, e.g. measuring the one-way downlink delay between ADA and CEA, given that their clocks are synchronized. Using the original in-band U-plane HE, the collaborative one-way delay measurement may be initiated by ADA via enriching a timestamp into a downlink U-plane packet and performed by CEA to read the timestamp from the packet header and compare the timestamp to CEA's own clock (then CEA may use the next uplink U-plane packet from the same flow for sending the measurement result in-band back to ADA). The same collaborative measurement may be performed by using off-band connections as follows (see FIG. 9 illustrating the collaborative one-way downlink delay measurement via the off-band connection). ADA and CEA have to pre-agree on a scheme that specifies which U-plane packets may be a subject to the collaborative measurements. For example, such a pre-agreement may specify that every packet where a QUIC sequence number is the multiple of 10, may be a subject to the collaborative measurement. ADA stores a timestamp corresponding to each downlink QUIC packet that is to be measured according to the pre-agreed scheme. The information to be stored includes QUIC CID, the QUIC sequence number, and the timestamp. As the QUIC sequence numbers increase monotonically per each transmitted packet (even on retransmitted packets), the QUIC sequence number along with CID unambiguously identifies a specific packet within a connection in a given direction. CEA also generates a timestamp when it receives a downlink packet selected by the same pre-agreed measurement scheme, and sends back CEA's own timestamp, CID, and the QUIC sequence number to ADA via the off-band connection. ADA may compute the downlink delay based on ADA's own timestamp and the one sent by CEA for the same packet (identified by QUIC CID/sequence number pair). A similar mechanism may be used to measure the uplink delay between CEA and ADA, wherein CEA generates the timestamp of each uplink packet selected by the measurement scheme, and sends the timestamp along with the packet's QUIC CID and sequence number to ADA by using the off-band connection. ADA also records its own timestamp for the same uplink packets when they arrive on the U-plane connection. The order of the two events (i.e. ADA receiving the timestamp from CEA, or ADA generating its own timestamp on the uplink U-plane packet) may be arbitrary, depending on the transport path configuration and conditions on the U-plane versus the off-band connection. However, the order of the events is not relevant from the measurement point of view. When ADA has obtained both its own timestamp as well as the one from CEA for a given uplink packet, ADA computes the uplink delay. As ADA itself is the consumer of the measurements, the delay value is not sent back to CEA.

The collaborative measurements may also be used to localize packet drops between CEA and ADA. First, ADA may detect the downlink QUIC packets that have been lost already in the internet (i.e. between the QUIC server and ADA) based on the gaps in the QUIC sequence numbers in the downlink direction. Similarly, CEA may detect the lost downlink packets between the QUIC server and CEA. CEA regularly sends a per connection loss report to ADA that specifies CID, a time window and the number of lost downlink packets within the time window. ADA compares the number of lost downlink packets received from CEA with ADA's own counter for the same time window. The difference gives the number of downlink packets lost between ADA and CEA (i.e. in the mobile backhaul). A similar mechanism may be used to measure and localize the uplink packet losses. CEA and ADA may both individually record the uplink packet losses based on the gaps in the per-connection QUIC sequence numbers in the uplink direction. CEA counts the uplink losses that happened between UE and CEA, whereas ADA detects the uplink losses between UE and ADA. CEA regularly sends the uplink losses CEA has detected, to ADA which subtracts the uplink losses from ADA's own measurements to localize the number of uplink losses between CEA and ADA.

Measuring RTT at CEA or ADA on the QUIC flow also requires a different approach (compared to the RTT measurements on TCP flows). With TCP, the sequence and ACK segments are clearly differentiated based on the accessible protocol headers. Comparing the TCP sequence and ACK numbers of packets within the same flow enables CEA and ADA to correlate a data segment with the corresponding ACK segment in the opposite direction. Each corresponding data/ACK pair gives an opportunity for the RTT measurement by calculating the time difference of their observation. With QUIC, however, data and ACK segments are not distinguishable based on publicly available protocol fields (DL/UL sequence numbers are not related, see FIG. 3). The RTT measurements in CEA and ADA require that in certain phases during a QUIC connection's lifetime, the pattern of the downlink and uplink packets implicitly reveals which packet is an ACK to a given previous data packet (without having to consider their QUIC sequence numbers).

Figure 10:
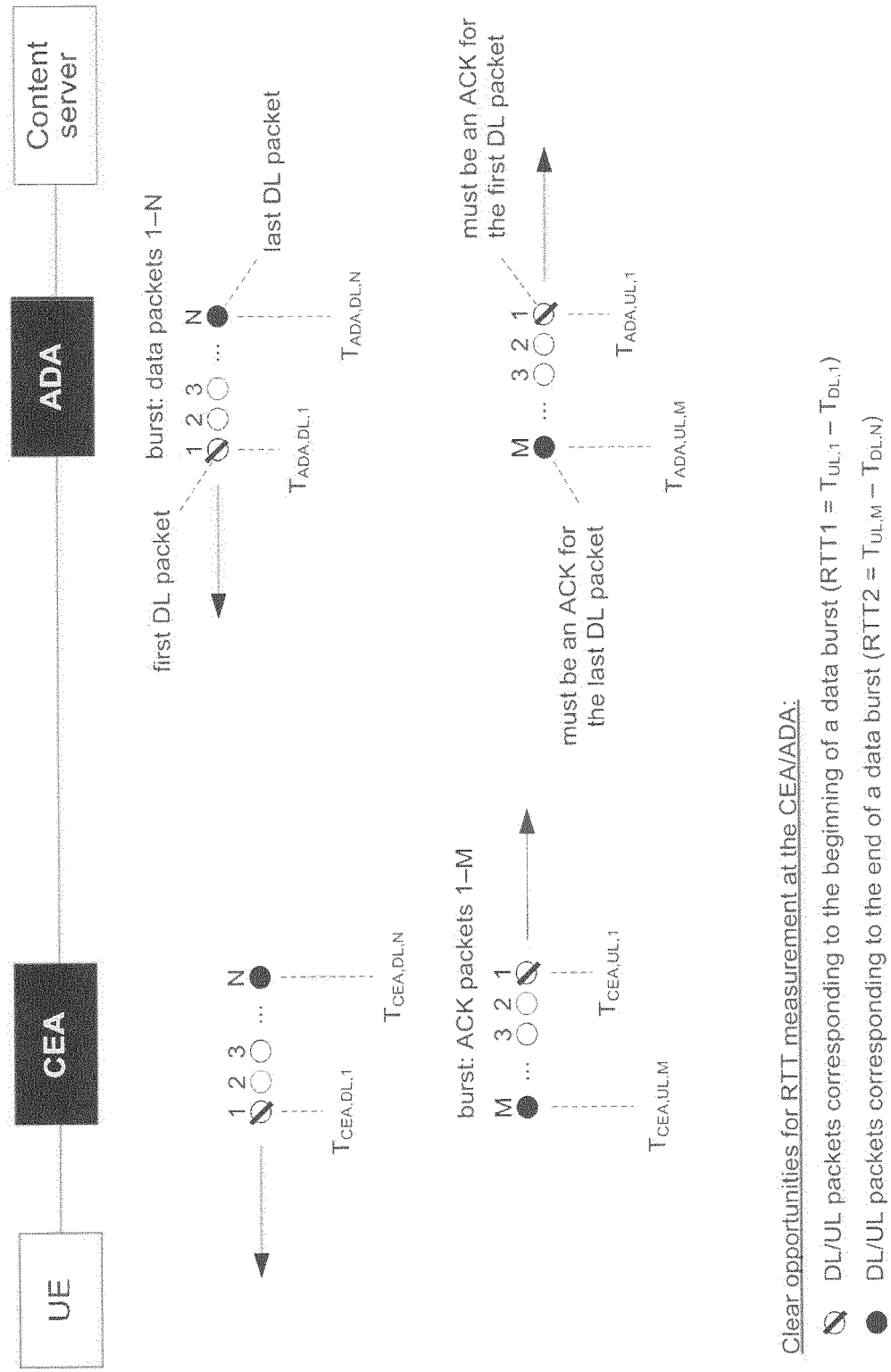
FIG. 10 illustrates RTT measurements according to an embodiment.

FIG. 10 illustrates the RTT measurements. An opportunity for the RTT measurement starts with the first packet ever sent in the connection (usually from UE to the server in uplink), which triggers a response packet sent in the opposite direction. Thus, the observation time of these initial packets enables to compute an initial RTT for the connection (in case UE initiated the connection establishment, the initial RTT is measured between ADA/CEA and a content server). Additionally, during the lifetime of the QUIC connection, data is usually transmitted in bursts (e.g. UE downloads a chunk of data followed by an idle time when no packets are transferred by UE or the server), which creates additional RTT measurement opportunities. Within each burst, the first data packet is the one that is acknowledged first by the receiver of the data, whereas the last data packet is the one that is ACKed by the last packet sent by the receiver. The correlation is illustrated in FIG. 10 for measuring RTT over a downlink data burst. CEA and ADA may independently perform the RTT measurement by using the same logic. TADA,DL,1 and TADA,DL,N denote the time of the first and last DL data packets, respectively, as observed by ADA. Similarly, TADA,UL,1 and TADA,UL,M denote the first and last UL packets observed by ADA in the same connection. TADA,UL,1>TADA,DL,1 and TADA,UL,M>TADA,DL,N. M may not be equal to N (usually, the receiver does not acknowledge each data packet individually, instead the receiver sends a cumulative ACK for every two data packets, thus M~N/2). ADA may generate two RTT samples (corresponding to the UE-ADA segment) from observing the burst pattern. The first RTT1 comes from the correlation of the first DL packet with the first UL packet, whereas the second RTT2 comes from the correlation of the last DL packet with the last UL packet. Initially, the beginning of the burst may be detected easily (i.e. being at the beginning of the connection). The end of the burst is detected by receiving no more DL and UL data packets after TADA,UL,M+RTT1 (i.e. more than one round-trip time has been elapsed from observing the last UL packet, making it very likely that UE has sent all the possible ACKs for the whole data it has received). The first DL packet observed after the end of the burst begins the next burst. Measuring RTT on the UL data bursts is possible by the same logic applied to the UL data and the DL ACK packets.

CEA and ADA may both measure RTTs separately towards UE and the content server. However, it is not necessary to carry out every possible measurement. For example, only CEA may measure RTT towards UE, whereas ADA measures RTT towards the server. CEA may use the off-band connection to report CEA-UE RTTs to ADA which correlates its own ADA-server measurements with those received from CEA. The RTT measurements combined with the one-way CEA-ADA delay measurements provides ADA with a full delay/RTT segmentation of the end-to-end path.

In an embodiment, the in-band HE apparatus is capable of handling connections using QUIC, in order to efficiently collect the U-plane measurements from QUIC connections.

Thus, an embodiment enables obtaining context-based correlated user plane measurement data for the QUIC connections. This may mean, for example, that the apparatus collects, in a correlated way, one or more of: user measurement data, application measurement data, quality of experience measurement data, network side quality of service measurement data and a set of key performance indicators. Correlated collecting, i.e. collecting in a correlated way, means that in one measurement round, that is, using the same packet or a packet and the corresponding response packet, the apparatus is able to qualify QoE, QoS and the network status at the same time, so that the collected QoE, QoS and network status insights each correspond to a given user's application at the current network condition. One measurement round involves performing the measurement at two measurement points. The measurement data obtained are two measurement points are then combined, i.e. correlated. The correlating enables creating an insight into current user application status regarding QoE, QoS and network status. This insight may then be used for performing the dynamic experience management. The same packet is measured in two different network locations, also referred to as measurement points. The two measurements regarding the same packet are correlated, i.e. combined, such that a mutual relationship is formed between the two measurements. Based on the correlating, the system or apparatus is then able to perform the dynamic experience management. Instead of the same packet, the correlating may be performed regarding a packet and a related packet, such as between a packet and a corresponding response packet.

Figure 11:
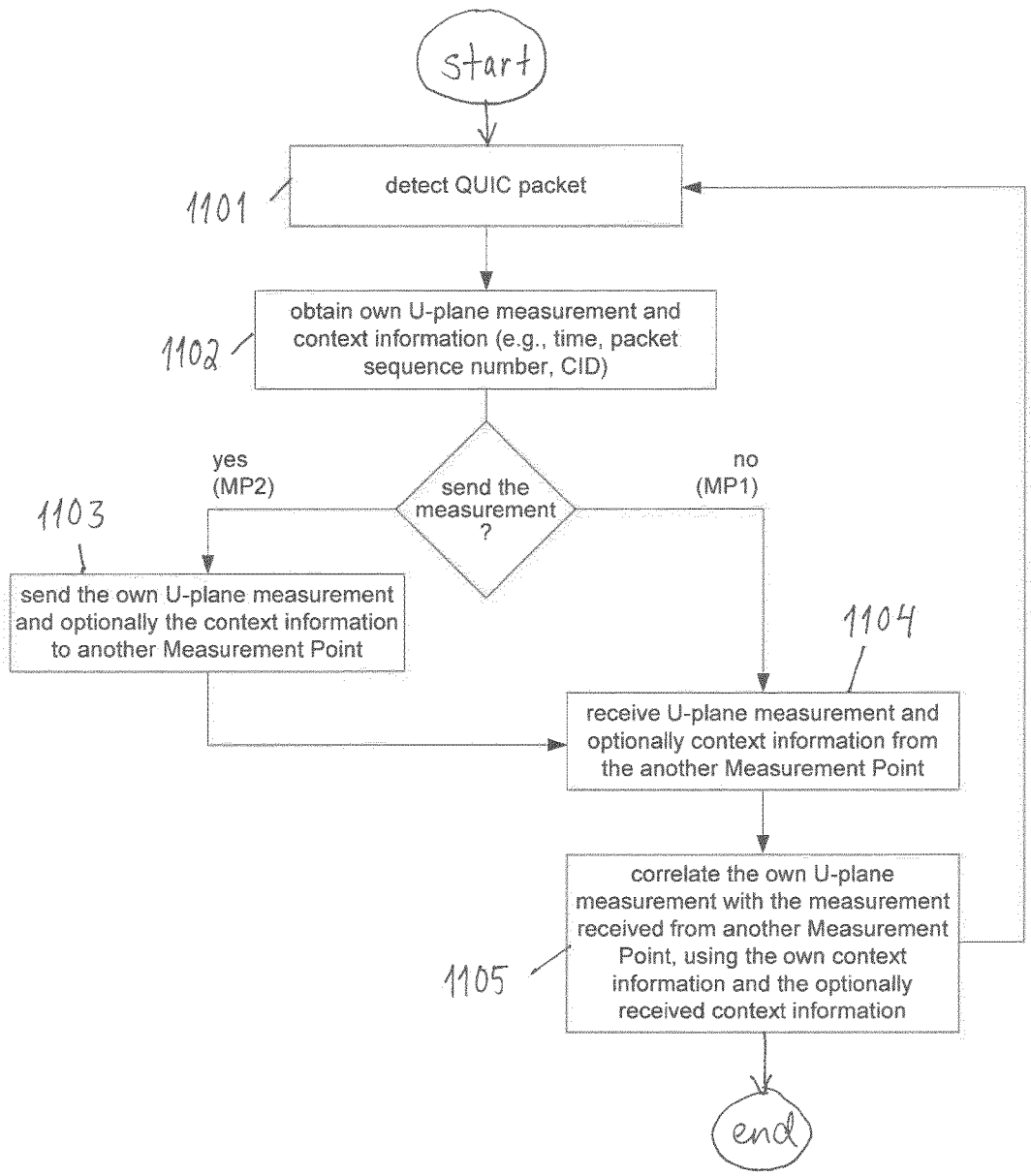
FIGS. 11 to 16 illustrates an exemplary process for dynamic experience management according to an embodiment of the invention.

FIG. 11 illustrates an exemplary process for dynamic experience management when using QUIC. Referring to FIG. 11, the network apparatus (such as ADA and/or CEA) detects (block 1101) user plane packets transmitted between network elements (e.g. UE, content server) of the communication system. Based on a detected user plane packet, the apparatus obtains (block 1102), at a first measurement point and at a second measurement point, user plane customer experience measurement information on the user plane packet (e.g. customer experience measurements are performed on the QUIC connection at the first measurement point and at the second measurement point) and optionally context information (see FIGS. 12, 13, 14). The context information may include, for example, a timestamp, packet sequence number and/or CID of the user plane packet. The steps are performed by both measurement points, wherein one measurement point is a "sender" (e.g. the second measurement point MP2) (i.e. it not only performs its own measurements but also sends information on the measurements to the other measurement point) whereas the other measurement point is a "receiver" (e.g. the first measurement point MP1) (i.e. it not only performs its own measurement but also receives measurement information from the other measurement point). The roles of the "sender" and "receiver" may change based on the type of measurement and the deployment of the measurement points. Thus the apparatus sends (block 1103), from the second measurement point to the first measurement point, user plane customer experience measurement information and optionally (in C-plane and off-band embodiments, see FIGS. 13 and 14) context information, obtained at the second measurement point. The apparatus receives (block 1104), at the first measurement point, the information sent by the second measurement point. The apparatus correlates (block 1105), user plane customer experience measurement information obtained (block 1102) at the first measurement point, with user plane customer experience measurement information received (block 1104) from the second measurement point regarding the same user plane packet or a related user plane packet, by using context information obtained (block 1102) at the first measurement point and context information received (1104) at the first measurement point (or context information of a user plane packet used to transfer the user plane customer experience measurement information to the first measurement point (IP options embodiment, see FIG. 12)).

Figure 12:
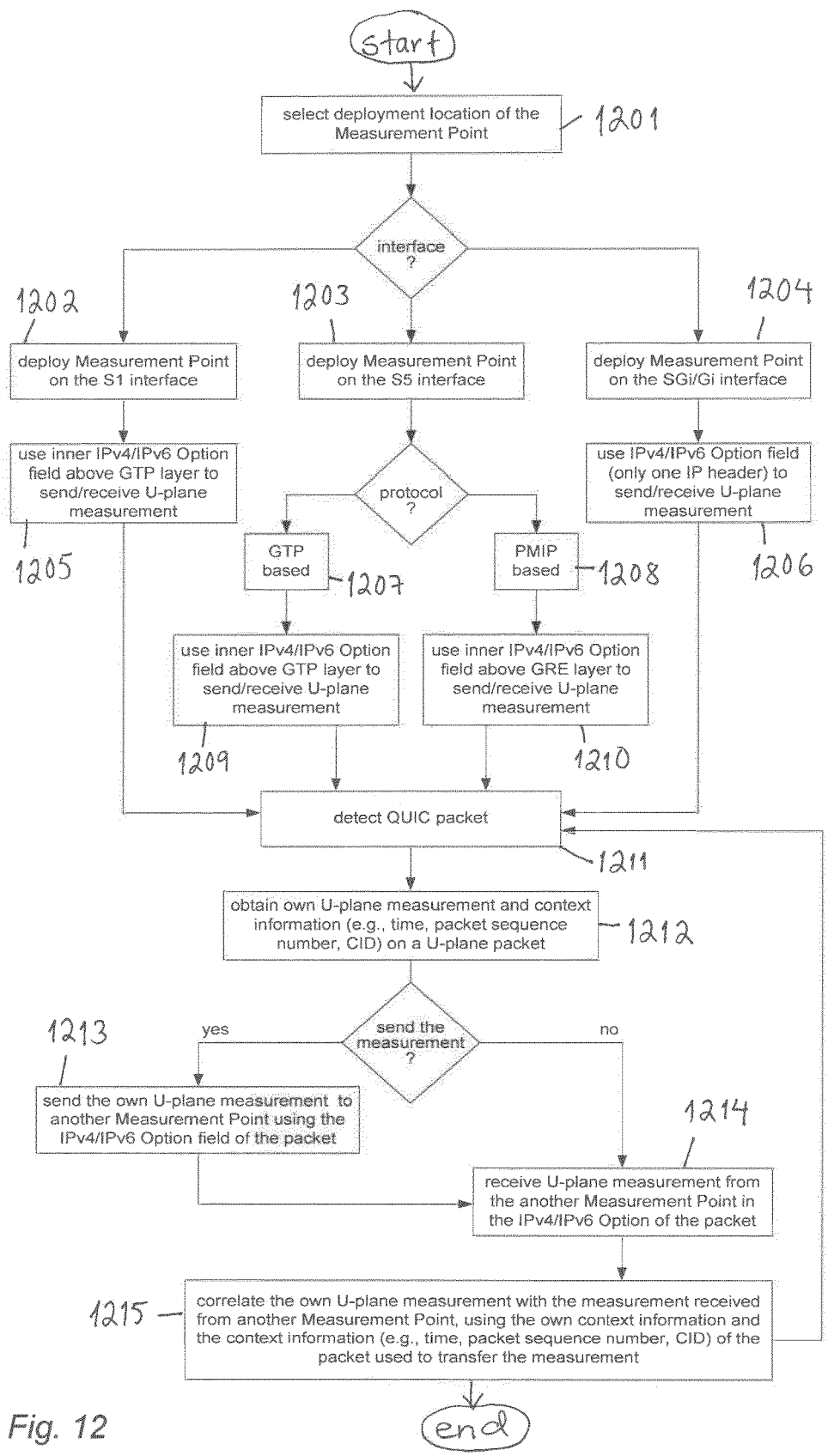

FIG. 12 illustrates an exemplary process for the dynamic experience management when using the IP options. Referring to FIG. 12, the apparatus is configured (block 1201) to make a decision on the deployment location of the measurement points. The measurement point may be selected to be deployed either on the S1 interface (block 1202), S5 interface (block 1203), or SGi/Gi interface (block 1204). If the measurement point is selected to be deployed on the S1 interface, the apparatus is configured (block 1205) to use an inner IPv4/IPv6 option field above the GTP layer for sending/receiving the U-plane measurement information. If the measurement point is selected to be deployed on the SGi/Gi interface, the apparatus is configured (block 1206) to use an IPv4/IPv6 option field (only one IP header) for sending/receiving the U-plane measurement information. If the measurement point is selected to be deployed on the S5 interface, the apparatus may be configured to use either a GTP-based protocol (block 1207) or PMIP-based protocol (block 1208). If the apparatus is configured to use the GTP-based protocol, the apparatus is configured (block 1209) to use the inner IPv4/IPv6 option field above the GTP layer for sending/receiving the U-plane measurement information. If the apparatus is configured to use the PMIP-based protocol, the apparatus is configured (block 1210) to use the IPv4/IPv6 option field above the GRE layer for sending/receiving the U-plane measurement information.

After that the apparatus may detect (block 1211) user plane packets transmitted between the network elements. Based on the detected U-plane packet, the apparatus obtains (block 1212), at the first measurement point and at the second measurement point, user plane customer experience measurement information (and context information at the first measurement point). The apparatus sends (block 1213) by using the IPv4/IPv6 option field of the U-plane packet, from the second measurement point to the first measurement point, user plane customer experience measurement information obtained at the second measurement point. Thus the user plane customer experience measurement information obtained at the second measurement point is inserted into the user plane packet used to transfer the user plane customer experience measurement information from the second measurement point to the first measurement point. The apparatus receives (block 1214), in the first measurement point, the information sent by the second measurement point (in the IPv4/IPv6 option field of the U-plane packet). The apparatus correlates (block 1215), user plane customer experience measurement information obtained at the first measurement point, with user plane customer experience measurement information received from the second measurement point regarding the same user plane packet or a related user plane packet, by using context information obtained (block 1212) at the first measurement point and context information included in the U-plane packet used to transfer (block 1213) the measurement information from the second measurement point to the first measurement point (the context information including, for example, the timestamp, packet sequence number and/or CID of the received U-plane packet).

The U-plane packet used to transfer the measurement information from the second measurement point to the first measurement point may be "any" user plane packet, i.e. it is not necessarily the same U-plane packet that is detected and measured by the first measurement point and/or the second measurement point. The context information included in the user plane packet which user plane packet is used to transfer the user plane customer experience measurement information from the second measurement point to the first measurement point may comprise context information on the user plane packet which user plane packet is used to transfer the user plane customer experience measurement information from the second measurement point to the first measurement point. Alternatively/in addition, the context information included in the user plane packet which user plane packet is used to transfer the user plane customer experience measurement information from the second measurement point to the first measurement point may comprise context information on the second measurement point, and/or other context information such as protocol-related (e.g. existing or future protocol-related) context information.

Figure 13:
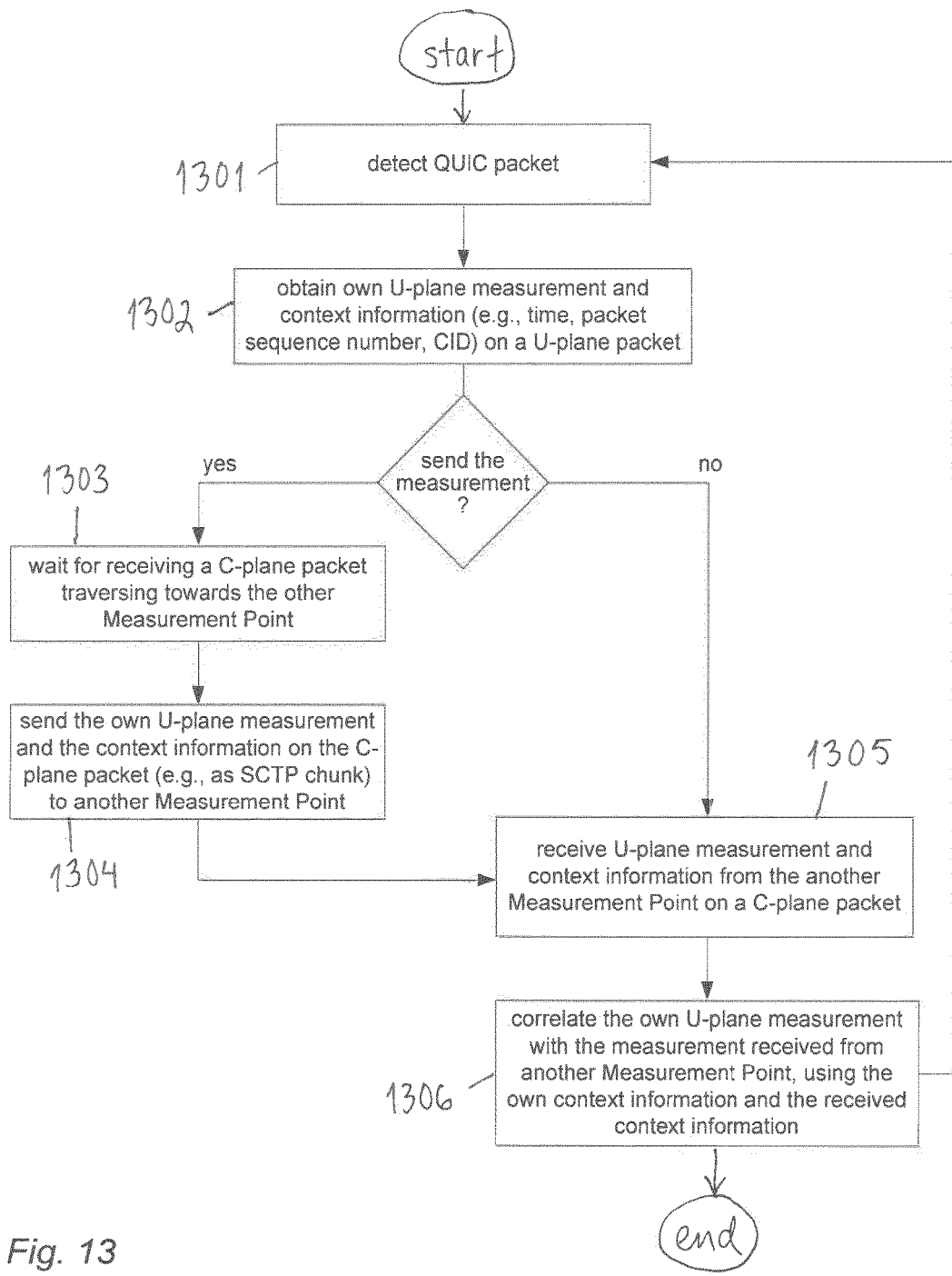

FIG. 13 illustrates an exemplary process for dynamic experience management when using C-plane packets for communication. Referring to FIG. 13, the apparatus detects (block 1301) U-plane packets transmitted between the network elements. Based on the detected U-plane packet, the apparatus obtains (block 1302), at the first measurement point and at the second measurement point, context information and user plane customer experience measurement information on the U-plane packet (the context information including, for example, the timestamp, packet sequence number, and/or CID of the measured U-plane packet). The apparatus may wait (block 1303) until a C-plane packet traversing towards the first measurement point, is received at the second point. Then the apparatus sends (block 1304, in the C-plane packet (e.g. as SCTP chunk)) from the second measurement point to the first measurement point, U-plane customer experience measurement information and the context information, obtained at the second measurement point. The apparatus receives (block 1305), at the first measurement point, the information sent (in the C-plane packet) by the second measurement point. The apparatus correlates (block 1306), user plane customer experience measurement information obtained at the first measurement point, with user plane customer experience measurement information received from the second measurement point regarding the same user plane packet or a related user plane packet, by using context information obtained at the first measurement point and context information received (block 1305) at the first measurement point from the second measurement point.

Figure 14:
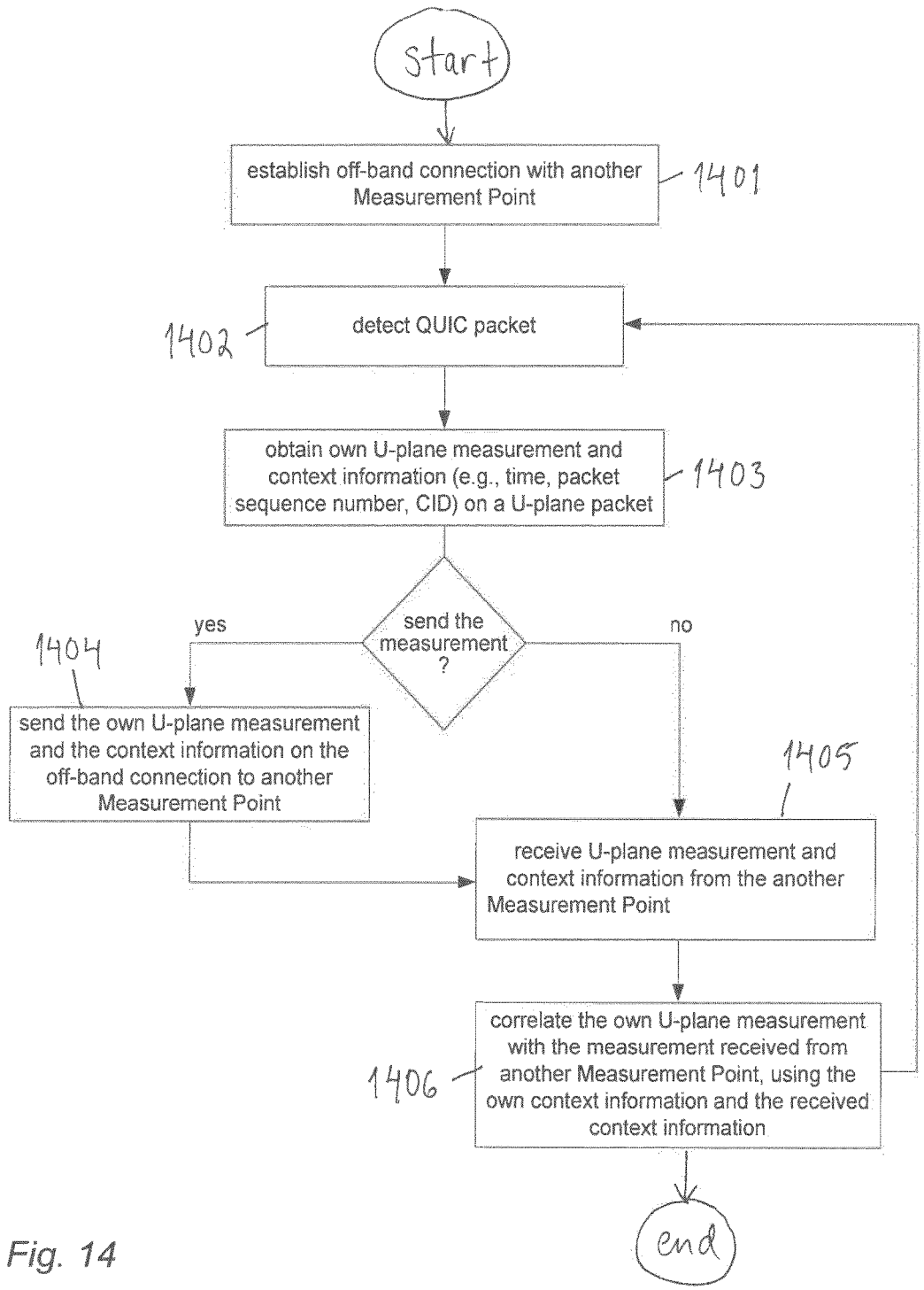

FIG. 14 illustrates an exemplary process for dynamic experience management when using dedicated off-band communication. Referring to FIG. 14, the apparatus establishes (block 1401) an off-band connection between the first measurement point and the second measurement point. The apparatus detects (block 1402) U-plane packets transmitted between the network elements. Based on the detected U-plane packet, the apparatus obtains (block 1403), at the first measurement point and at the second measurement point, context information and user plane customer experience measurement information on the U-plane packet (the context information including, for example, the timestamp, packet sequence number, and/or CID of the measured U-plane packet). The apparatus sends (block 1404, on the off-band connection) from the second measurement point to the first measurement point, U-plane customer experience measurement information and context information, obtained at the second measurement point. The apparatus receives (block 1405), at the first measurement point, the information sent (on the off-band connection) by the second measurement point. The apparatus correlates (block 1406), user plane customer experience measurement information obtained at the first measurement point, with user plane customer experience measurement information received from the second measurement point regarding the same user plane packet or a related user plane packet, by using context information obtained at the first measurement point and context information received (1405) at the first measurement point from the second measurement point.

Figure 15:
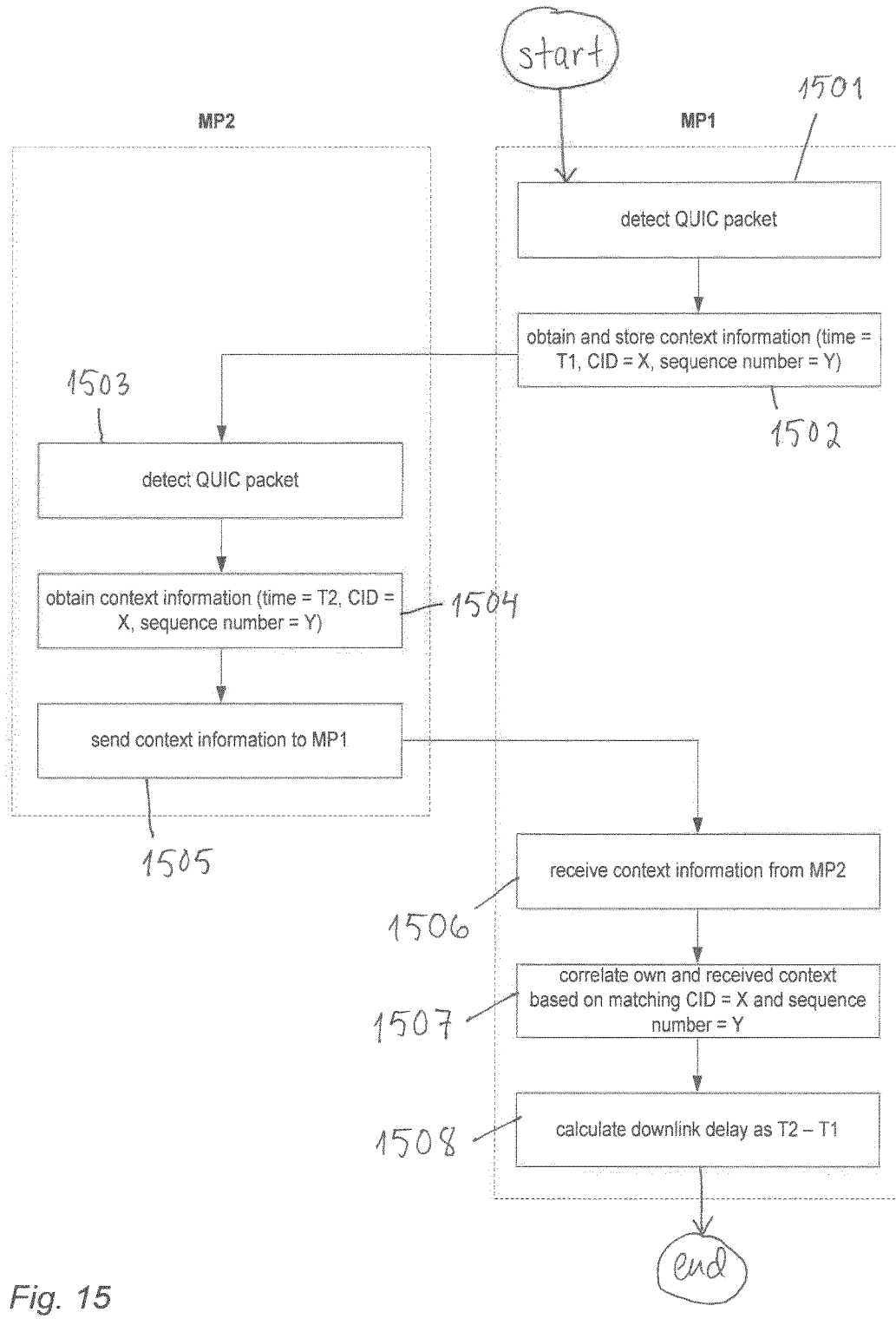

FIG. 15 illustrates an exemplary process for measuring one-way delay over QUIC connections between two measurement points. Referring to FIG. 15, the apparatus detects (block 1501), at the first measurement point, a U-plane packet transmitted between the network elements. Based on the detected U-plane packet, the apparatus obtains and stores (block 1502), at the first measurement point, context information on the U-plane packet (e.g. timestamp=T1, packet sequence number=Y, CID=X). The apparatus NE detects (block 1503), at the second measurement point, the U-plane packet transmitted between the network elements, and based on the detected U-plane packet, the apparatus obtains (block 1504), at the second measurement point, context information on the U-plane packet (e.g. timestamp=T2, packet sequence number=Y, CID=X). The apparatus sends (block 1505), from the second measurement point to the first measurement point, the context information obtained at the second measurement point. The apparatus receives (block 1506), at the first measurement point, the context information sent by the second measurement point. The apparatus correlates (block 1507), context information obtained at the first measurement point with context information received from the second measurement point (the context information having identical CIDs (e.g. CID=X) and identical packet sequence numbers (e.g. packet sequence number=Y)). The apparatus calculates (block 1508) the downlink delay as the difference between the timestamps of the context information obtained at the first measurement point and at the second measurement point (delay=T2−T1).

Figure 16:
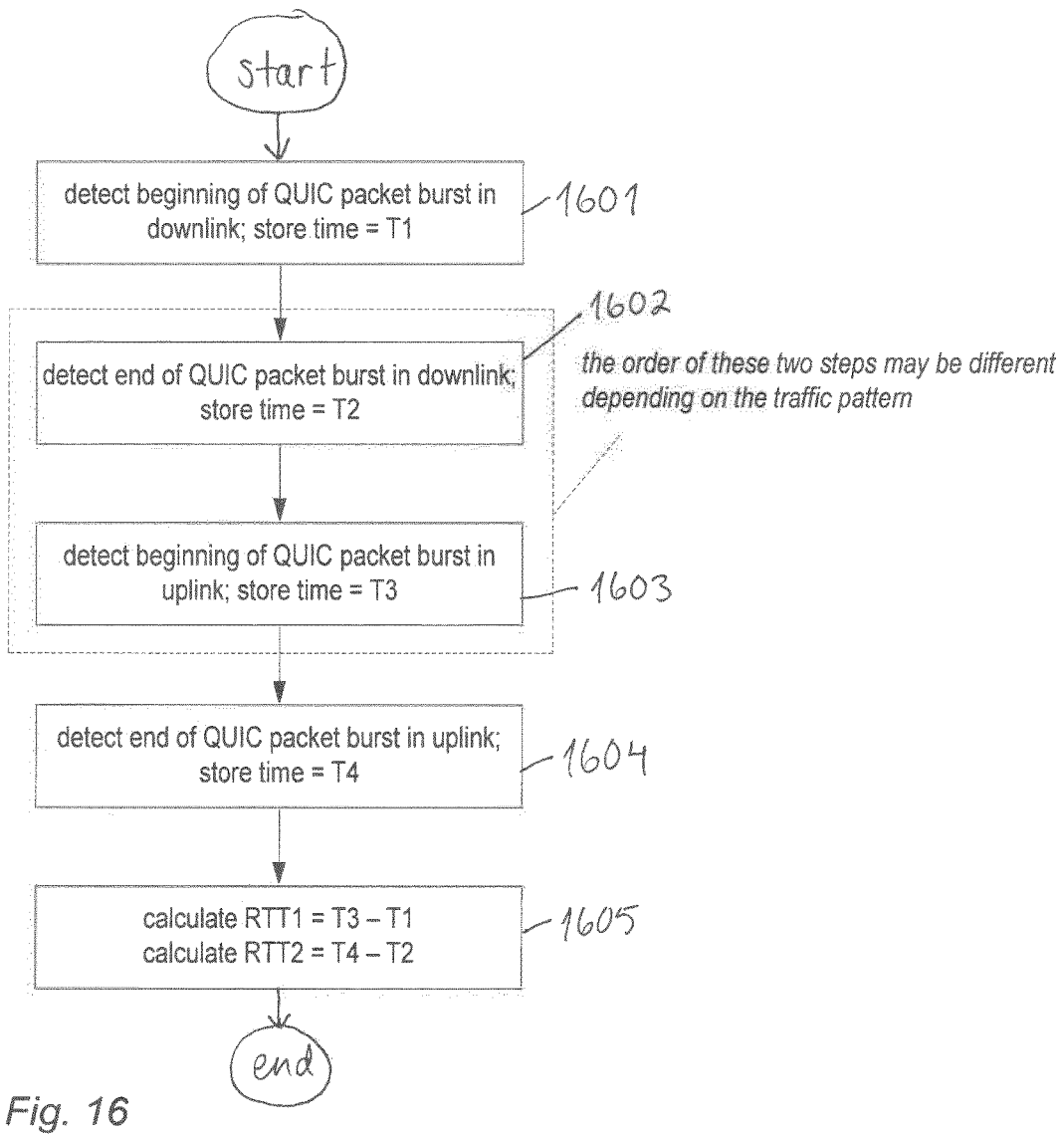

FIG. 16 illustrates an exemplary process for measuring RTT on QUIC connections at a measurement point. Referring to FIG. 16, the apparatus detects (block 1601), at the measurement point, the beginning of a QUIC packet burst transmitted in downlink. Based on the detecting, the apparatus may store (block 1601) the timestamp for the beginning of the downlink detection (e.g. timestamp=T1). The apparatus detects (block 1602), at the measurement point, the end of the QUIC packet burst transmitted in downlink. Based on the detecting, the apparatus may store (block 1602) the timestamp for the end of the downlink detection (e.g. timestamp=T2). The apparatus detects (block 1603), at the measurement point, the beginning of a QUIC packet burst transmitted in uplink. Based on the detecting, the apparatus may store (block 1603) the timestamp for the beginning of the uplink detection (e.g. timestamp=T3). The apparatus detects (block 1604), at the measurement point, the end of the QUIC packet burst transmitted in uplink. Based on the detecting, the apparatus may store (block 1604) the timestamp for the end of the uplink detection (e.g. timestamp=T4). The apparatus calculates (block 1605) RTT as the difference between the timestamps for the beginning of the QUIC packet bursts (e.g. RTT1=T3−T1), and/or as the difference between the timestamps for the end of the QUIC packet bursts (e.g. RTT2=T4−T2).

The embodiments are applicable to QUIC connections, VPN connections and/or any L2/L3 tunneling technologies used by end-to-end user connections.

An exemplary apparatus comprises means for carrying out any of the method steps as described above.

An exemplary computer program product is embodied on a distribution medium readable by a computer and comprises program instructions which, when loaded into an apparatus, execute any of the method steps as described above.

In an embodiment, besides the measurement information, the second measurement point may also add explicit context information in the U-plane packet that is used to transfer the measurement from MP2 to MP1. This may be beneficial if the same packet is not used to transfer the measurement on which the measurement itself was taken; therefore the implicit context indicated by the packet may differ from the context of the measurement itself. For example, if a packet R was used to take a measurement, and a packet S in the different direction is to be used to transfer the measurement, then packet S (i.e. the transfer opportunity) may come later after the packet R is measured, thus the context of the measurement (e.g. when exactly the packet was measured, or which exact packet was measured) may be enriched to packet S.

Figure 17:
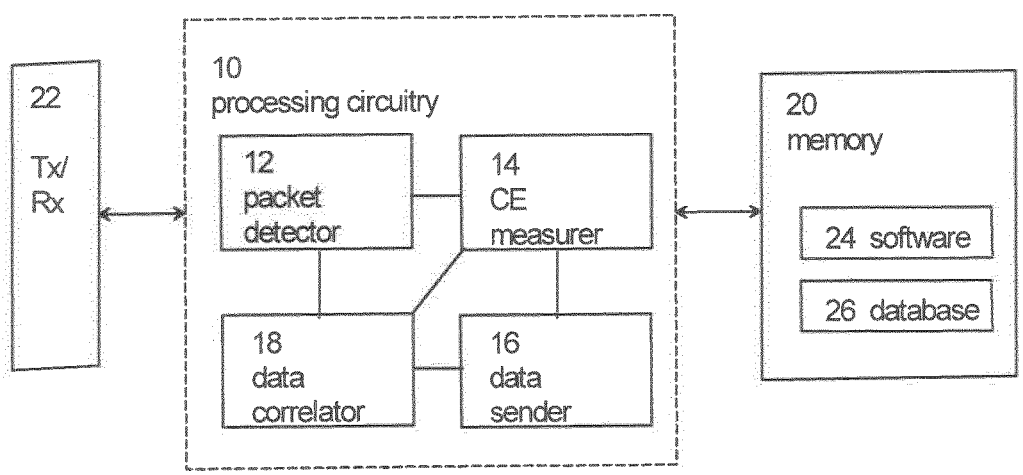
FIG. 17 illustrates a blocks diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described network element or network node. The at least one processor, the at least one memory, and the computer program code may thus be considered as an embodiment of means for executing the above-described procedures of the network element or the network node. FIG. 17 illustrates a block diagram of a structure of such an apparatus. The apparatus may be comprised in the network element or in the network node, e.g. the apparatus may form a chipset or a circuitry in the network element or in the network node. In some embodiments, the apparatus is the network element or the network node.

The apparatus comprises a processing circuitry 10 comprising the at least one processor. The processing circuitry 10 may comprise a packet detector 12 configured to detect user plane packets transmitted between network elements of the communication system. The processing circuitry 10 further comprises a CE measurer 14 configured to obtain (based on a detected user plane packet), at a first measurement point and at a second measurement point, user plane customer experience measurement information and optionally context information. The processing circuitry 10 may further comprise a data sender 16 configured to provide, to the first measurement point, user plane customer experience measurement information and optionally context information, obtained at the second measurement point. A data correlator 18 comprised in the processing circuitry 10 is configured to correlate the user plane customer experience measurement information obtained at the first measurement point, with the user plane customer experience measurement information received from the second measurement point regarding the same user plane packet or a related user plane packet, by using the context information obtained at the first measurement point and context information received at the first measurement point.

The processing circuitry 10 may comprise the circuitries 12 to 18 as sub-circuitries, or they may be considered as computer program modules executed by the same physical processing circuitry. The memory 20 may store one or more computer program products 24 comprising program instructions that specify the operation of the circuitries 12 to 18. The memory 20 may further store a database 26 comprising definitions for dynamic experience management, for example. The apparatus may further comprise a communication interface 22 providing the apparatus with radio communication capability with the terminal devices. The communication interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the communication interface may be connected to a remote radio head comprising at least an antenna and, in some embodiments, radio frequency signal processing in a remote location with respect to the base station. In such embodiments, the communication interface may carry out only some of radio frequency signal processing or no radio frequency signal processing at all. The connection between the communication interface and the remote radio head may be an analogue connection or a digital connection. In some embodiments, the communication interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 17 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

ADA analytics and decision agent
CEA customer experience agent
CID connection identity
CSP communications service provider
DEM dynamic experience management
DHCP dynamic host configuration protocol
DL downlink
DPI deep packet inspection
eNB evolved node-B
GPRS general packet radio service
GRE generic routing encapsulation
GTP GPRS tunneling protocol
HE header enrichment
HSS home subscriber server
HTTP hypertext transfer protocol
HW hardware
IMS IP multimedia system
IP internet protocol
ISP internet service provider
JSON JavaScript object notation
LTE long term evolution
LTE-A LTE-advanced
MME mobility management entity
MTU maximum transfer unit
NFV network function virtualization
OTT over the top
PCEF policy control enforcement point
PDN packet data network
PGW PDN gateway
PMIP proxy mobile IP
QoE quality of experience
QUIC quick UDP internet connection
RTP real-time transport protocol
SACK selective acknowledgement
SAI service at once intelligence
SCTP stream control transport protocol
SGW serving gateway
TCP transmission control protocol
TLS transport layer security
TLV type length value
UDP user datagram protocol
UE user equipment
UL uplink
VNF virtual network function
VoLTE voice over LTE
VPN virtual private network
WCDMA wideband code division multiple access
Tx transmitter
Rx receiver

The invention claimed is:

1. A method in a network apparatus, comprising:
detecting user plane packets transmitted over a Quick User Datagram Protocol Internet Connection QUIC connection between network elements of a communication system;
based on a detected user plane packet, obtaining, at a first measurement point and at a second measurement point, user plane customer experience measurement information and user plane packet context information including a timestamp, a packet sequence number and/or a connection identity of the user plane packet;
transmitting to the first measurement point the user plane customer experience measurement information and the user plane packet context information, obtained at the second measurement point, wherein the second measurement point transmits to the first measurement point the user plane customer experience measurement information and the user plane packet context information by using in-band Internet Protocol IP options for header enrichment or by using in-band control plane packet header enrichment; and
correlating the user plane customer experience measurement information obtained at the first measurement point, with the user plane customer experience measurement information received from the second measurement point regarding the same user plane packet or a related user plane packet, by using the corresponding context information obtained at the first measurement point and the corresponding context information received at the first measurement point.

2. The method of claim 1, wherein the method comprises at least one of:
multiplexing streams of information into the same control plane packet by using SCTP payload structured as chunks; and
setting selected bits of an unknown chunk type to a pre-defined value in order to indicate that the unknown chunk type is non-erroneous.

3. The method of claim 1, wherein the method comprises performing collaborative user plane customer experience measurements by at least one of:
measuring one-way delay or packet loss between the first measurement point and the second measurement point; and
collecting at a measurement point RTT measurements over a radio access segment.

4. The method of claim 1, wherein the method comprises one or more of:
using a QUIC connection identity available in a QUIC packet header, as a unique identifier of a QUIC user plane connection;
using a combination of an L2 tunnelling protocol identity and an L3 tunnelling protocol identity as a unique identifier of a VPN user plane connection;
pre-agreeing on a scheme for selecting user plane packets for one-way downlink delay measurement; and
storing information on a connection identity, a connection sequence number, and a timestamp corresponding to each downlink user plane packet that is to be measured according to the pre-agreed scheme.

5. The method of claim 1, wherein the method comprises at least one of:
generating for the second measurement point its own timestamp when the second measurement point receives a user plane downlink packet selected according to the pre-agreed scheme, sending from the second measurement point its own timestamp, the connection identity, and the connection sequence number via the off-band connection to the first measurement point, and computing for the first measurement point the downlink delay based on the first measurement point's own timestamp and the one sent from the second measurement point for the same packet; and generating for the second measurement point its own timestamp when the second measurement point receives an uplink packet selected according to the pre-agreed measurement scheme, sending from the second measurement point its own timestamp, the connection identity, and the connection sequence number to the first measurement point via the off-band connection, and computing for the first measurement point the uplink delay based on the first measurement point's own timestamp and the one sent from the second measurement point for the same packet.

6. The method of claim 1, wherein the method comprises:

regularly sending from the second measurement point a connection-specific downlink packet loss report to the first measurement point;

specifying for the first measurement point a connection identity, a time window, and the first measurement point's own connection-specific downlink packet loss counter within the time window;

comparing the connection-specific downlink packet loss report received from the second measurement point with the first measurement point's own connection-specific downlink packet loss counter for the same time window, wherein the difference between the connection-specific downlink packet loss report received from the second measurement point and the first measurement point's own connection-specific downlink packet loss counter, indicates the number of downlink packets lost between the first measurement point and the second measurement point.

7. The method of claim 1, wherein the method comprises:

recording uplink packet losses based on gaps in connection-specific sequence numbers in an uplink direction, wherein the second measurement point counts the uplink packet losses between a base station and the second measurement point, and the first measurement point counts the uplink packet losses between the base station and the first measurement point;

regularly sending, to the first measurement point, information on the uplink packet losses recorded at the second measurement point;

comparing the connection-specific uplink packet loss information received from the second measurement point with the uplink packet losses counted by the first measurement point, wherein the difference between the connection-specific uplink packet loss information received from the second measurement point and the uplink packet losses counted by the first measurement point, indicates the number of uplink packets lost between the first measurement point and the second measurement point.

8. An apparatus comprising:
at least one processor; and
at least one memory including a computer program code, wherein the at least one memory and the computer program code are configured, with the at least one processor, to cause the apparatus to detect user plane packets transmitted over a Quick User Datagram Protocol Internet Connection QUIC connection between network elements of a communication system;

based on a detected user plane packet, obtain, at a first measurement point and at a second measurement point, user plane packet context information and user plane customer experience measurement information including a timestamp, a packet sequence number and/or a connection identity of the user plane packet;

transmit to the first measurement point the user plane customer experience measurement information and the user plane packet context information, obtained at the second measurement point, wherein the second measurement point transmits to the first measurement point the user plane customer experience measurement information and the user plane packet context information by using in-band Internet Protocol IP options for header enrichment or by using in-band control plane packet header enrichment; and correlate the user plane customer experience measurement information obtained at the first measurement point, with the user plane customer experience measurement information received from the second measurement point regarding the same user plane packet or a related user plane packet, by using the corresponding context information obtained at the first measurement point and the corresponding context information received at the first measurement point.

9. A communication system comprising an apparatus comprising:
at least one processor; and
at least one memory including a computer program code, wherein the at least one memory and the computer program code are configured, with the at least one processor, to cause the apparatus to:

detect user plane packets transmitted over a Quick User Datagram Protocol Internet Connection QUIC connection between network elements of a communication system;

based on a detected user plane packet, obtain, at a first measurement point and at a second measurement point, user plane packet context information and user plane customer experience measurement information including a timestamp, a packet sequence number and/or a connection identity of the user plane packet;

transmit to the first measurement point the user plane customer experience measurement information and the user plane packet context information, obtained at the second measurement point, wherein the second measurement point transmits to the first measurement point the user plane customer experience measurement information and the user plane packet context information by using in-band Internet Protocol IP options for header enrichment or by using in-band control plane packet header enrichment; and correlate the user plane customer experience measurement information obtained at the first measurement point, with the user plane customer experience measurement information received from the second measurement point regarding the same user plane packet or a related user plane packet, by using the corresponding context information obtained at the first measurement point and the corresponding context information received at the first measurement point.

10. A computer program product embodied on a non-transitory distribution medium readable by a computer and comprising program instructions which, when loaded into the computer, execute a computer process comprising causing a network apparatus to execute the following:

detecting user plane packets transmitted over a Quick User Datagram Protocol Internet Connection QUIC connection between network elements of a communication system;

based on a detected user plane packet, obtaining, at a first measurement point and at a second measurement point, user plane customer experience measurement information and user plane packet context information including a timestamp, a packet sequence number and/or a connection identity of the user plane packet;

transmitting to the first measurement point the user plane customer experience measurement information and the user plane packet context information, obtained at the second measurement point, wherein the second measurement point transmits to the first measurement point the user plane customer experience measurement information and the user plane packet context information by using in-band Internet Protocol IP options for header enrichment or by using in-band control plane packet header enrichment; and correlating the user plane customer experience measurement information obtained at the first measurement point, with the user plane customer experience measurement information received from the second measurement point regarding the same user plane packet or a related user plane packet, by using the corresponding context information obtained at the first measurement point and the corresponding context information received at the first measurement point.

11. The apparatus of claim 8, wherein the apparatus is further caused to perform at least one of the following:

multiplex streams of information into the same control plane packet by using SCTP payload structured as chunks; and set selected bits of an unknown chunk type to a predefined value in order to indicate that the unknown chunk type is non-erroneous.

12. The apparatus of claim 8, wherein the apparatus is further caused to perform collaborative user plane customer experience measurements by at least one of the following:

measure one-way delay or packet loss between the first measurement point and the second measurement point; and collect at a measurement point RTT measurements over a radio access segment.

13. The apparatus of claim 8, wherein the apparatus is further caused to perform at least one of the following:

use a QUIC connection identity available in a QUIC packet header, as a unique identifier of a QUIC user plane connection;

use a combination of an L2 tunnelling protocol identity and an L3 tunnelling protocol identity as a unique identifier of a VPN user plane connection;

pre-agree on a scheme for selecting user plane packets for one-way downlink delay measurement; and store information on a connection identity, a connection sequence number, and a timestamp corresponding to each downlink user plane packet that is to be measured according to the pre-agreed scheme.

14. The apparatus of claim 13, wherein the apparatus is further caused to perform at least one of the following:

generate for the second measurement point its own timestamp when the second measurement point receives a user plane downlink packet selected according to the pre-agreed scheme, send from the second measurement point its own timestamp, the connection identity, and the connection sequence number via the off-band connection to the first measurement point, and compute for the first measurement point the downlink delay based on the first measurement point's own timestamp and the one sent from the second measurement point for the same packet; and generate for the second measurement point its own timestamp when the second measurement point receives an uplink packet selected according to the pre-agreed measurement scheme, send from the second measurement point its own timestamp, the connection identity, and the connection sequence number to the first measurement point via the off-band connection, and compute for the first measurement point the uplink delay based on the first measurement point's own timestamp and the one sent from the second measurement point for the same packet.

15. The apparatus of claim 8, wherein the apparatus is further caused to perform:

regularly send from the second measurement point a connection-specific downlink packet loss report to the first measurement point;

specify for the first measurement point a connection identity, a time window, and the first measurement point's own connection-specific downlink packet loss counter within the time window;

compare the connection-specific downlink packet loss report received from the second measurement point with the first measurement point's own connection-specific downlink packet loss counter for the same time window, wherein the difference between the connection-specific downlink packet loss report received from the second measurement point and the first measurement point's own connection-specific downlink packet loss counter, indicates the number of downlink packets lost between the first measurement point and the second measurement point.

16. The apparatus of claim 8, wherein the apparatus is further caused to perform:

record uplink packet losses based on gaps in connection-specific sequence numbers in an uplink direction, wherein the second measurement point counts the uplink packet losses between a base station and the second measurement point, and the first measurement point counts the uplink packet losses between the base station and the first measurement point;

regularly send, to the first measurement point, information on the uplink packet losses recorded at the second measurement point;

compare the connection-specific uplink packet loss information received from the second measurement point with the uplink packet losses counted by the first measurement point, wherein the difference between the connection-specific uplink packet loss information received from the second measurement point and the uplink packet losses counted by the first measurement point, indicates the number of uplink packets lost between the first measurement point and the second measurement point.

\* \* \* \* \*